(12) United States Patent
So et al.

(10) Patent No.: US 7,921,769 B2
(45) Date of Patent: *Apr. 12, 2011

(54) BOWL AND BASKET AND SALAD SPINNER INCORPORATING SUCH AN ASSEMBLY

(75) Inventors: Kwok Kuen So, Hong Kong (CN); Yiu Chung Wan, Hong Kong (CN)

(73) Assignee: Kwok Kuen SO, Kowloon, Hong Kong (CN)

( * ) Notice: Subject to any disclaimer, the term of this patent is extended or adjusted under 35 U.S.C. 154(b) by 846 days.

This patent is subject to a terminal disclaimer.

(21) Appl. No.: 11/857,230

(22) Filed: Sep. 18, 2007

(65) Prior Publication Data

US 2009/0000981 A1    Jan. 1, 2009

(30) Foreign Application Priority Data

Jun. 28, 2007 (EP) .................................... 07252615

(51) Int. Cl.
*B01D 33/00* (2006.01)
*A47J 43/24* (2006.01)
(52) U.S. Cl. ................ 99/495; 210/380.1; 220/8; 34/58
(58) Field of Classification Search .................... 99/495, 99/496; 220/6, 8; 206/216, 541, 549, 499; 34/312, 58; 210/380.1
See application file for complete search history.

(56) References Cited

U.S. PATENT DOCUMENTS

| 4,040,460 | A | * | 8/1977 | Thornton | 220/8 |
| 5,064,535 | A | | 11/1991 | Hsu | |
| 5,662,026 | A | * | 9/1997 | Prakasa | 99/413 |
| 7,080,463 | B1 | | 7/2006 | Johnson | |
| 7,654,402 | B2 | * | 2/2010 | Kusuma et al. | 220/8 |
| 2008/0164264 | A1 | * | 7/2008 | Fung | 220/573.1 |

FOREIGN PATENT DOCUMENTS

| EP | 1 348 369 A | 10/2003 |
| EP | 1 764 017 A1 | 3/2007 |
| FR | 829 700 A | 7/1938 |
| FR | 0 384 179 | 8/1990 |
| GB | 2 228 559 A | 8/1990 |

* cited by examiner

*Primary Examiner* — Reginald L Alexander
(74) *Attorney, Agent, or Firm* — William J. Sapone; Coleman Sudol Sapone P.C.

(57) ABSTRACT

A bowl and basket assembly (100, 200) is disclosed as including a perforated basket (104, 204) and a bowl (102, 202) for receiving said basket, the basket including a top body part (104a, 204a), a middle body part (104b, 204b) and a third body part (104c, 204c) connected with each other via a number of links (126, 205), in which the body parts are movable relative to one another between an expanded configuration in which the top body part (104a, 204a) sits on the middle body part (104b, 204b), and a collapsed configuration in which the middle body part (104b, 204b) is within the top body part (104a, 204a), and the third body part (104c, 204c) is within the middle body part (104b, 204b).

39 Claims, 20 Drawing Sheets

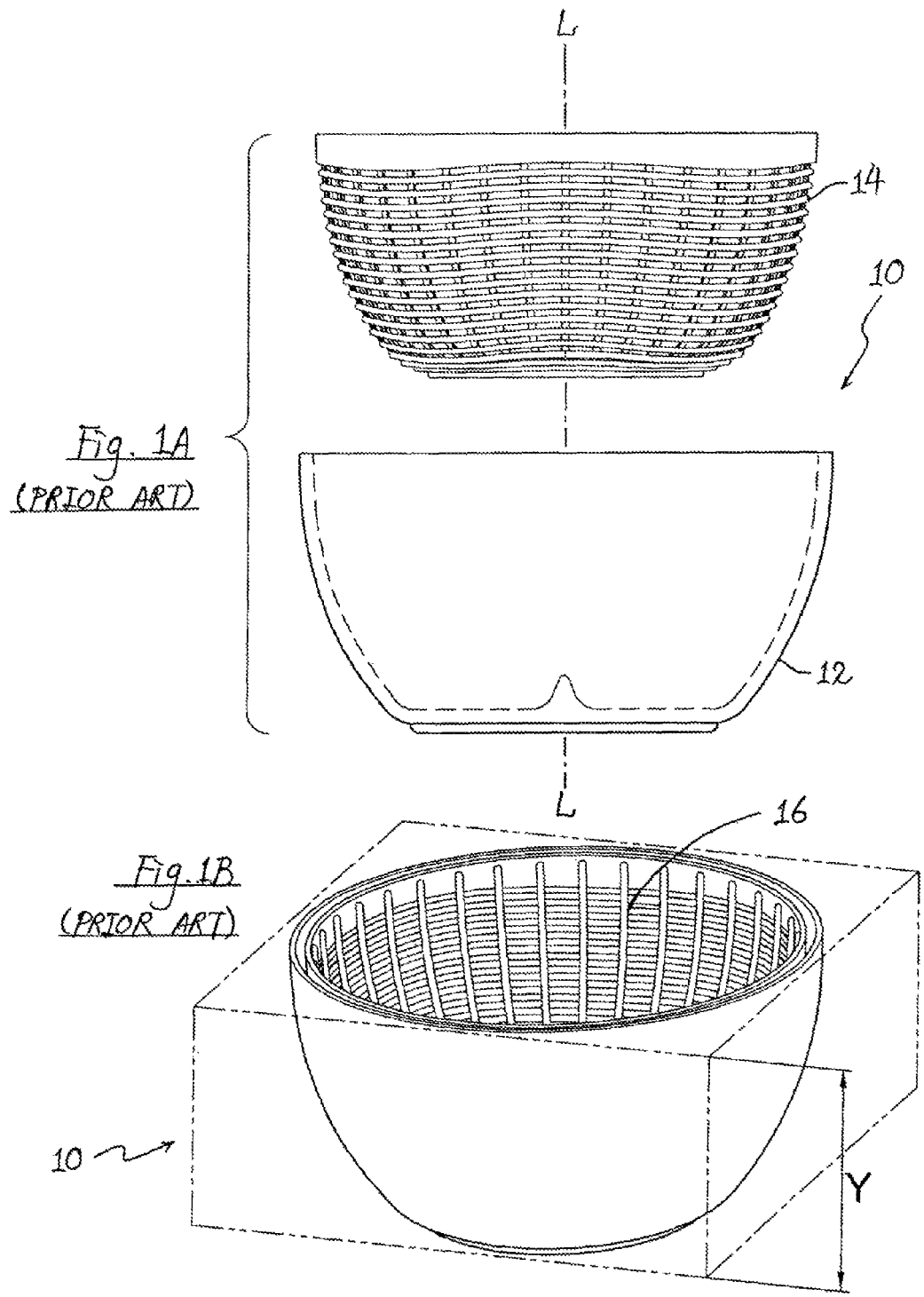

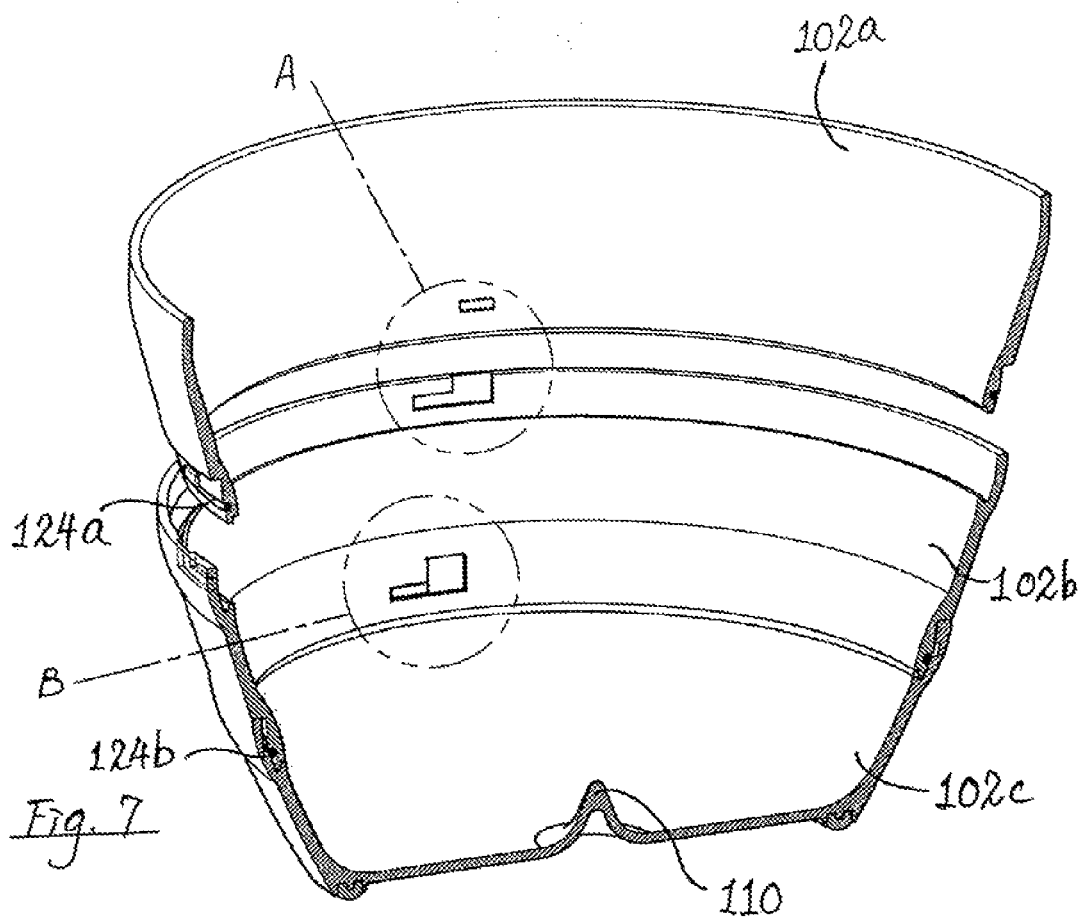
Fig. 7
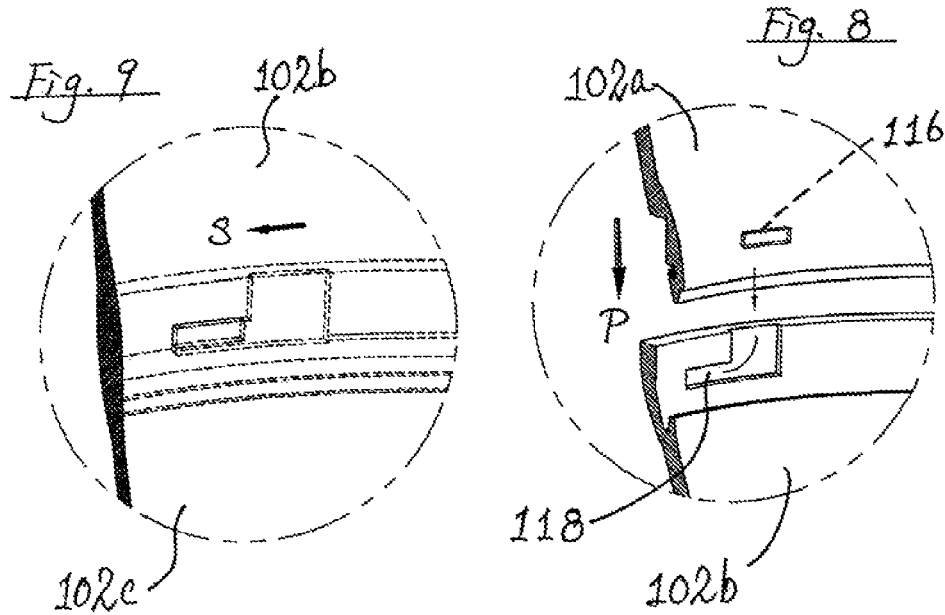
Fig. 9
Fig. 8

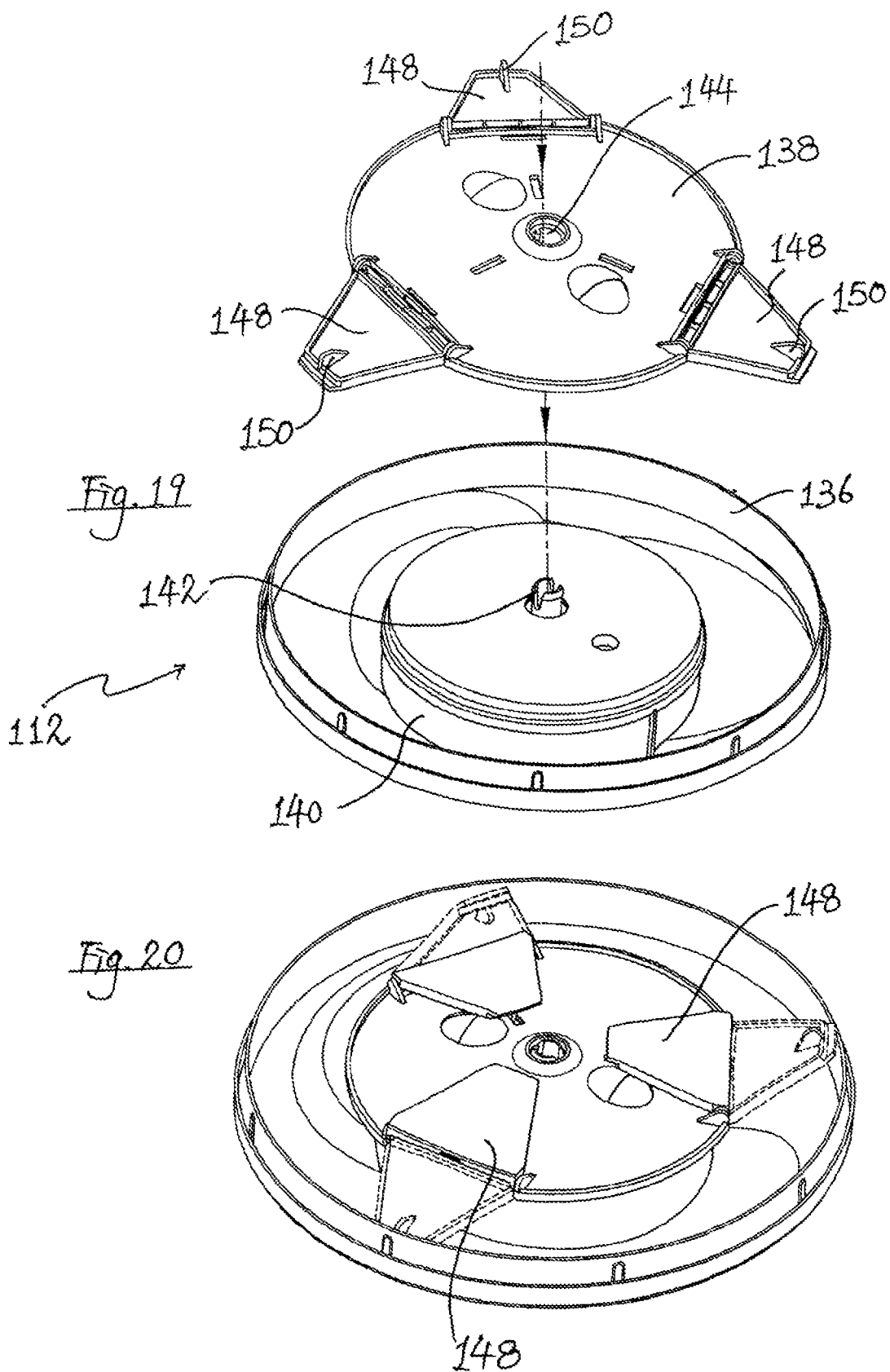

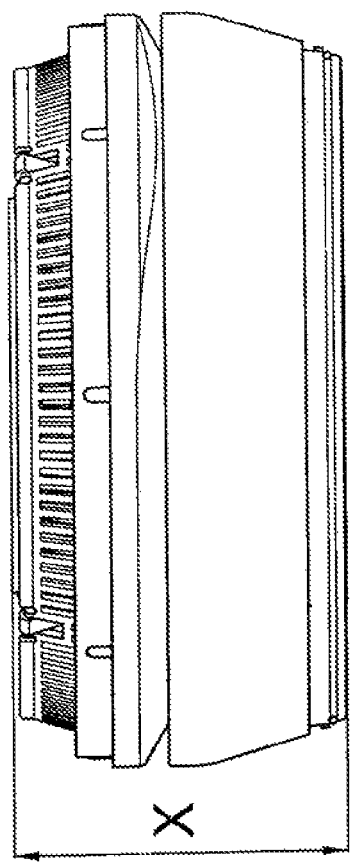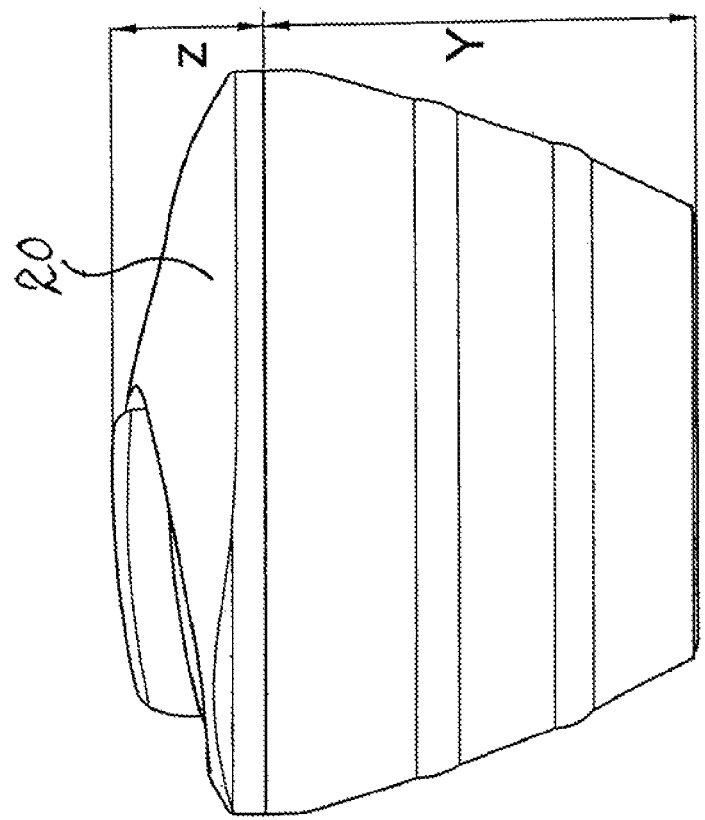
Fig. 24

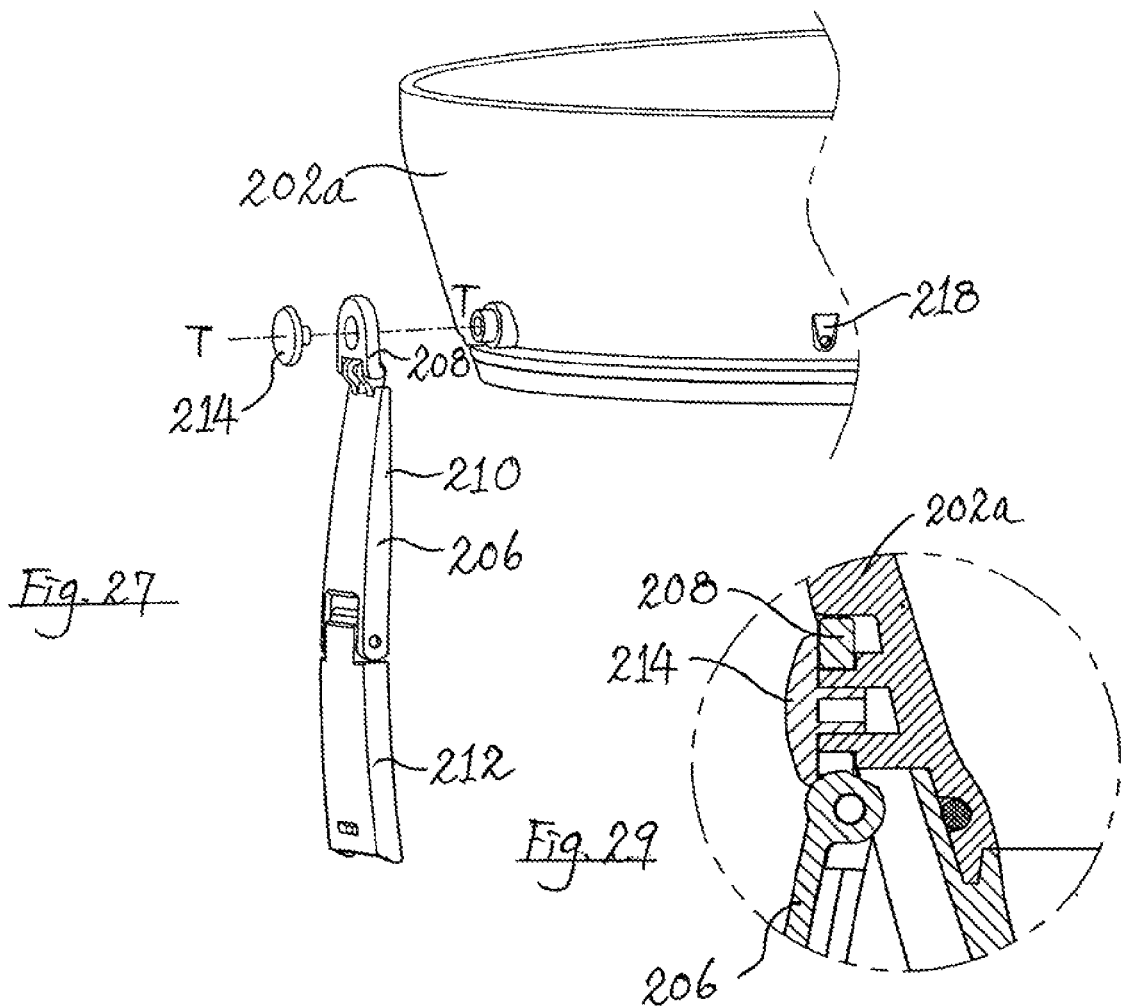
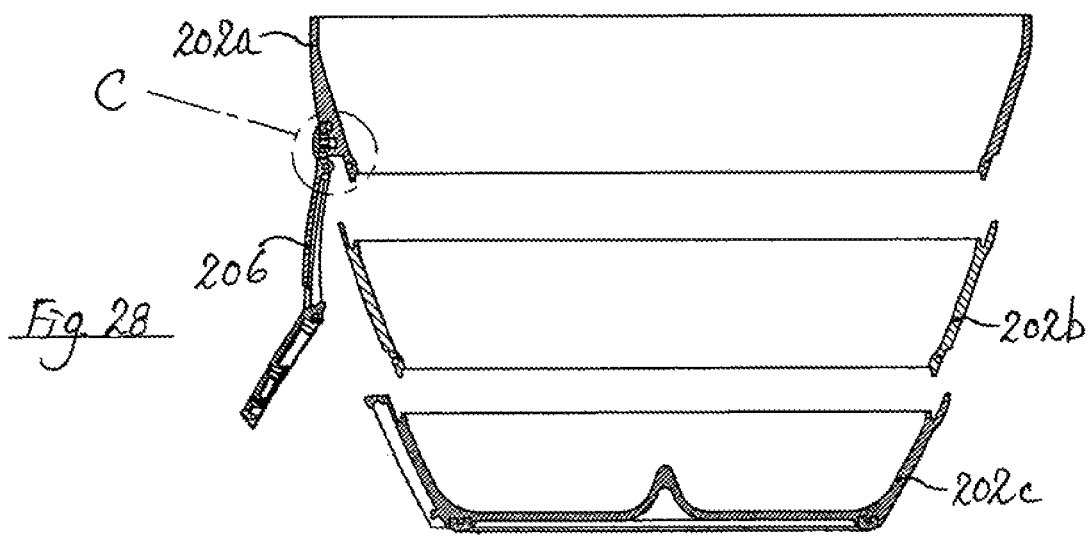

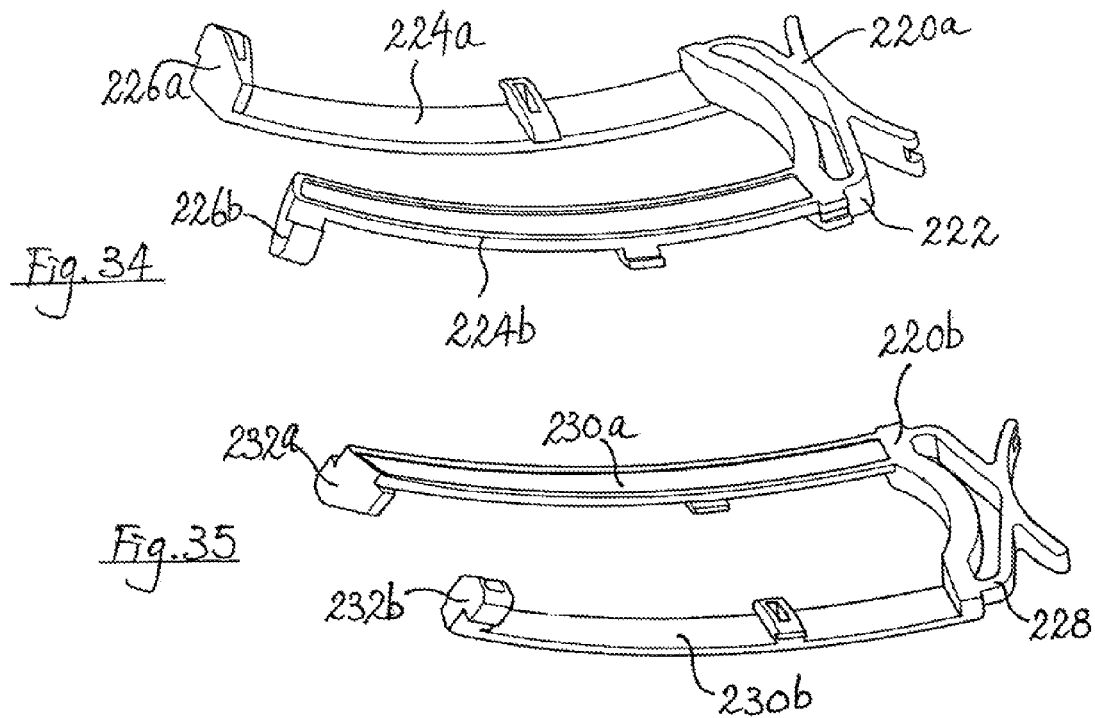
Fig. 34
Fig. 35
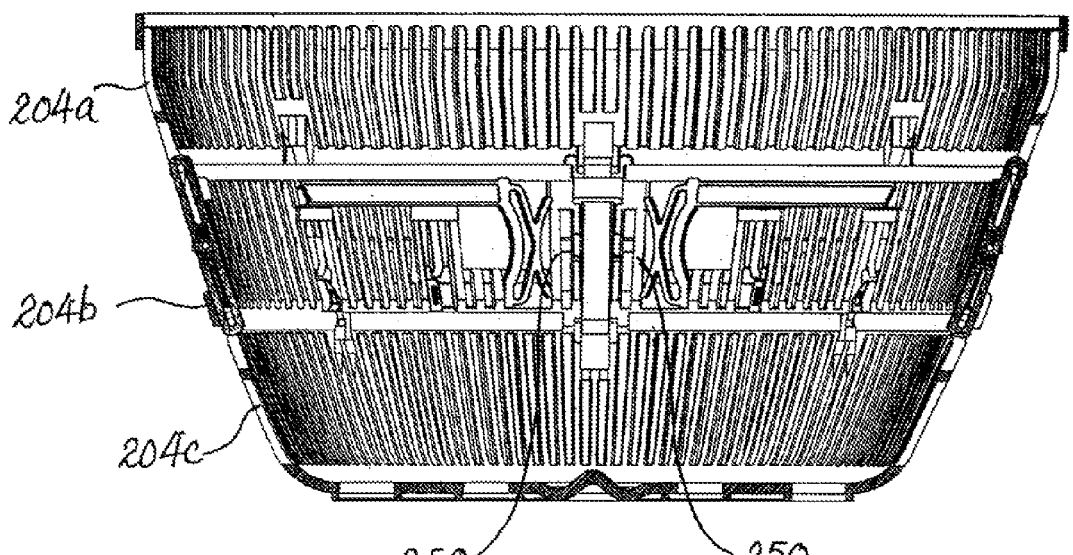
Fig. 36

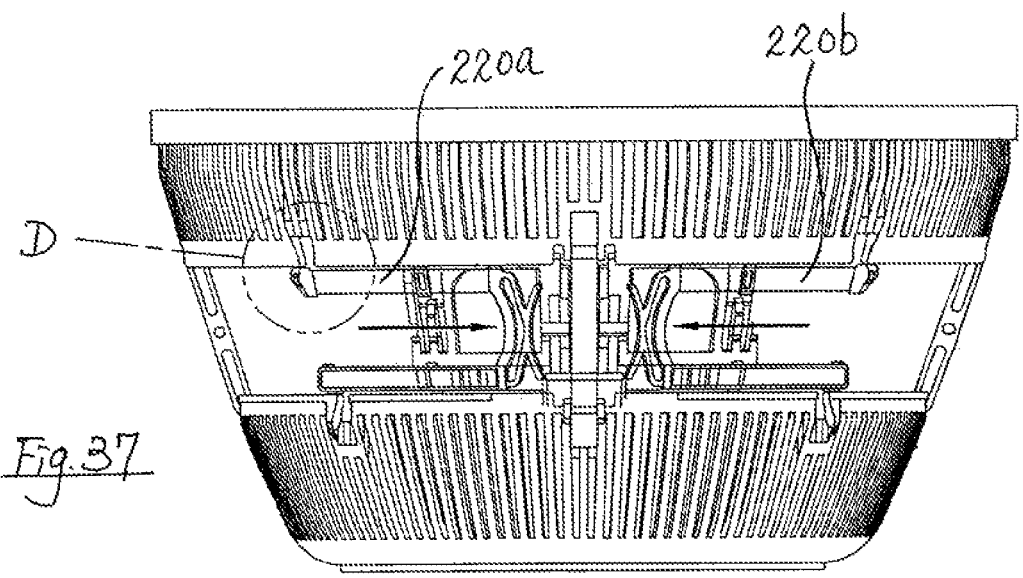
Fig. 37
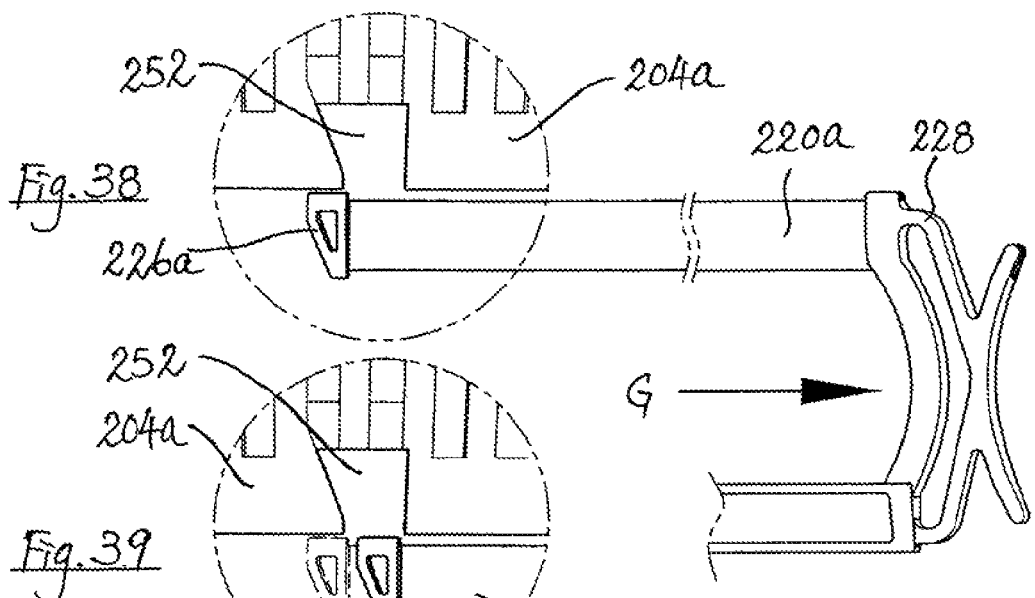
Fig. 38
Fig. 39
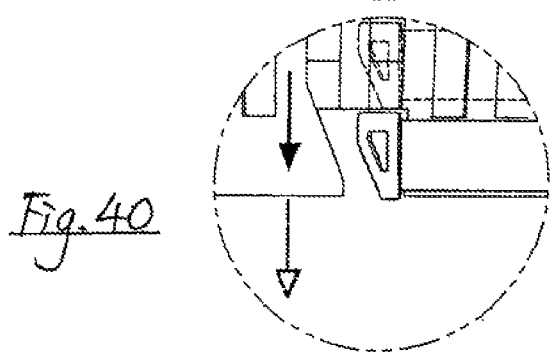
Fig. 40

US 7,921,769 B2

BOWL AND BASKET AND SALAD SPINNER INCORPORATING SUCH AN ASSEMBLY

TECHNICAL FIELD

This invention relates to a bowl and basket assembly, in particular such an assembly suitable for use in a salad spinner, and a salad spinner incorporating such an assembly.

BACKGROUND

As shown in FIG. 1A, a conventional bowl and basket assembly, generally designated as 10, includes at an outer bowl 12 and an inner perforated basket 14 for holding foodstuffs, e.g. vegetables. The basket 14 is receivable within the outer bowl 12 for draining purposes. This assembly 10 may also form part of a salad spinner in which the basket 14 is rotatable relative to the outer bowl 12 about a common longitudinal axis L-L. During the rotational movement, the foodstuffs held by the basket 14 is dried as water attached to it is spun off and collected by the outer bowl 12. A cover may be provided for covering the bowl 12 and basket 14. In some other conventional salad spinners, mechanisms are provided for driving the basket 14 to rotate relative to the bowl 12 to dry the foodstuffs held by the basket 14.

As can be seen in FIG. 1B, when the bowl and basket assembly 10 is packaged, for example, for transport purposes, it occupies a space with a height Y which is no less than the height of the outer bowl 12. In addition, the assembly 10 so packaged has an empty space 16 which is not utilized.

SUMMARY OF THE INVENTION

It is thus an object of the present invention to provide a bowl and basket assembly, a bowl and basket assembly kit, a salad spinner and a salad spinner kit which are more compact when packaged, or at least to provide a useful alternative to the public.

According to a first aspect of the present invention, there is provided a bowl and basket assembly including a perforated basket; and a bowl for receiving said basket; characterized in that said basket includes at least a first body member and a second body member connected with each other via at least one link member, wherein said body members are movable relative to each other between a first configuration in which said first body member sits on said second body member, and a second configuration in which said second body member is within said first body member.

According to a second aspect of the present invention, there is provided a bowl and basket assembly kit including at least a first body member and a second body member connected with each other via at least one link member to form perforated basket; and a bowl for receiving said basket; characterized in that said body members are movable relative to each other between a first configuration in which said first body member sits on said second body member, and a second configuration in which said second body member is within said first body member.

According to a third aspect of the present invention, there is provided a salad spinner including a bowl and basket assembly, said bowl and basket assembly including a perforated basket; and a bowl for receiving said basket; characterized in that said basket includes at least a first body member and a second body member connected with each other via at least one link member, wherein said body members are movable relative to each other between a first configuration in which said first body member sits on said second body member, and a second configuration in which said second body member is within said first body member.

According to a fourth aspect of the present invention, there is provided a salad spinner kit including a bowl and basket assembly kit, said bowl and basket assembly kit including at least a first body member and a second body member connected with each other via at least one link member to form perforated basket; and a bowl for receiving said basket; characterized in that said body members are movable relative to each other between a first configuration in which said first body member sits on said second body member, and a second configuration in which said second body member is within said first body member.

DESCRIPTION OF THE DRAWINGS

Embodiments of the present invention will now be described, by way of examples only, with reference to the accompanying drawings, in which:

FIG. 1A is an exploded view of a conventional bowl and basket assembly;

FIG. 1B shows the way in which the conventional assembly of FIG. 1A is packaged;

FIG. 7 is a sectional perspective view showing the manner of engagement between the body parts of the outer bowl shown in FIG. 4;

FIG. 8 is an enlarged view of the encircled part marked "A" in FIG. 7;

FIG. 9 is an enlarged view of the encircled part marked "B" in FIG. 7;

FIG. 19 is an exploded view of the cover and driving mechanism assembly of the salad spinner shown in FIG. 3;

FIG. 20 is an assembled view of the cover and driving mechanism assembly of the salad spinner shown in FIG. 19;

FIG. 24 compares the respective space taken up by a packaged conventional salad spinner and the packaged salad spinner shown in FIG. 21;

FIG. 27 is an enlarged view of the clasp of the outer bowl shown in FIG. 25;

FIG. 28 is an exploded sectional view of the outer bowl shown in FIG. 25;

FIG. 29 is an enlarged view of the encircled part marked "C" in FIG. 28;

FIG. 34 is a perspective view of a lock of the basket shown in FIG. 32;

FIG. 35 is a perspective view of another lock of the basket shown in FIG. 32;

FIG. 36 is a sectional view of the basket shown in FIG. 32;

FIG. 37 is a side view of the basket shown in FIG. 32 with the middle body part removed, leaving only the locks behind, for illustration purposes;

FIG. 38 is an enlarged view of the encircled part marked "D" in FIG. 37, with the lock;

FIGS. 39 and 40 are views corresponding to FIG. 38 showing movement of the lock allowing un-locking and collapse of the basket shown in FIG. 32;

DETAILED DESCRIPTION OF THE INVENTION

Figure 2A:
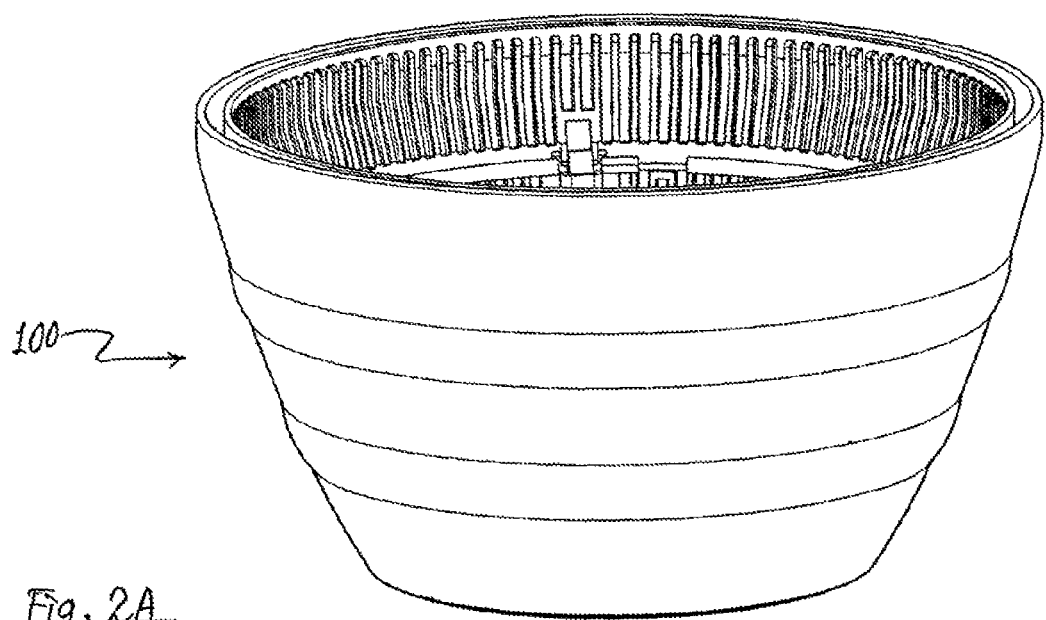
FIG. 2A is a perspective view of a bowl and basket assembly according to a first embodiment of the present invention.
Figure 2B:
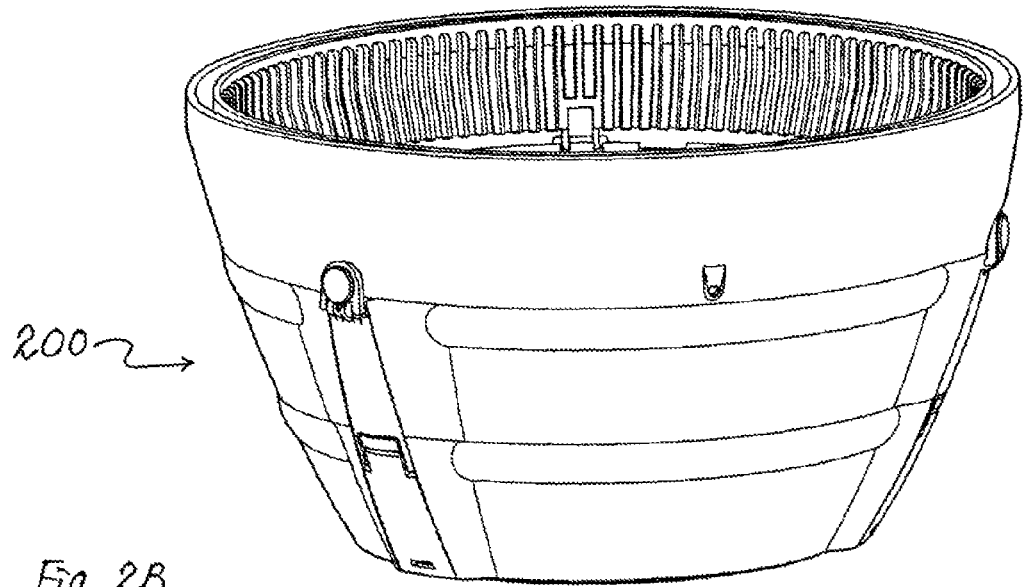
FIG. 2B is a perspective view of a bowl and basket assembly according to a second embodiment of the present invention.

FIG. 2A shows a bowl and basket assembly according to a first embodiment of the present invention, generally designated as 100, and FIG. 2B shows a bowl and basket assembly according to a second embodiment of the present invention, generally designated as 200.

Figure 3:
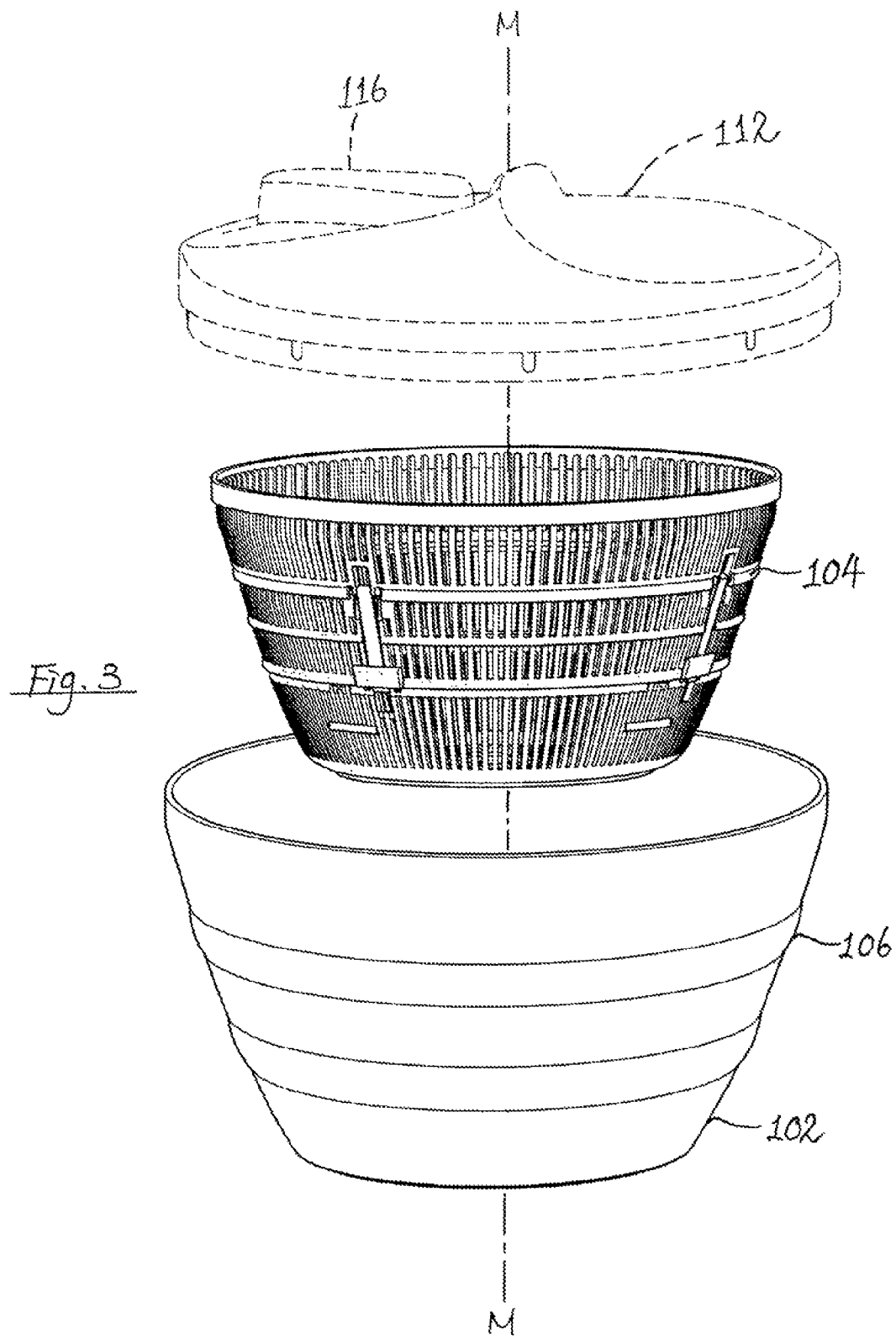
FIG. 3 is an exploded view of a salad spinner incorporating the assembly shown in FIG. 2A.

As shown in FIG. 3, the basket and bowl assembly 100 includes an outer bowl 102 receiving a perforated inner basket 104. The bowl 102 has a generally upstanding wall 106 and a bottom 108 (see FIG. 8) from which a protrusion 110 extends upwardly (see FIG. 7). The bottom of the basket 104 sits on the protrusion 110 such that the basket 104 may be caused to rotate relative to the bowl 102 about a common longitudinal axis M-M. A cover 112 (shown in dotted lines) may be provided for covering the upper open end of the bowl 102 and that of the basket 104 for forming a salad spinner.

Figure 4:
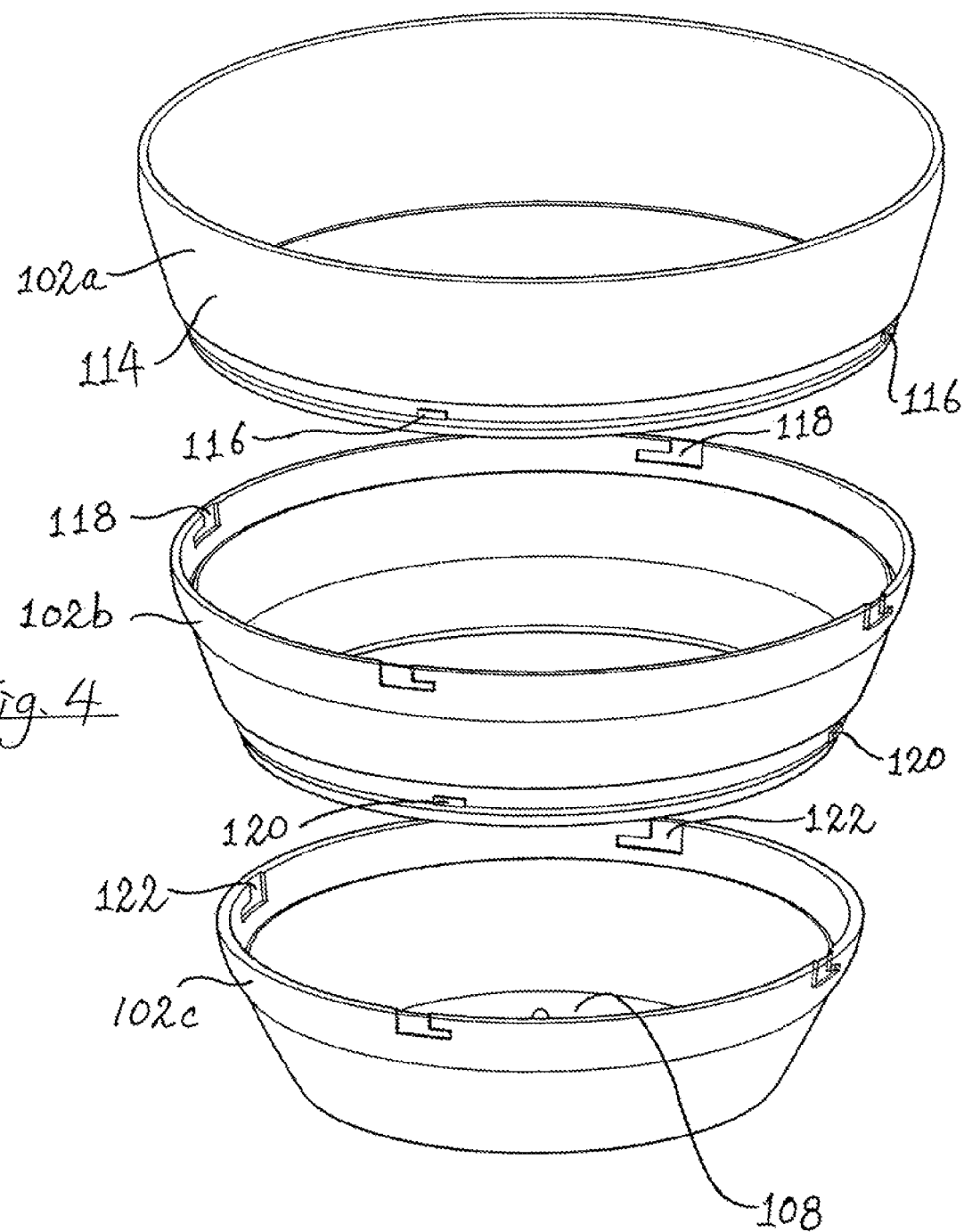
FIG. 4 is an exploded view of the outer bowl of the assembly shown in FIG. 2A.

Turning to FIG. 4, it can be seen that the bowl 102 includes a top body part 102a, a middle body part 102b, and a bottom body part 102c. The top body part 102a has an annular upstanding wall 114 along an outer surface of a lower end of which are provided four rectangular protrusions 116 (of which only two are shown in FIG. 4). As to the middle body part 102b, along an inner surface of an upper edge of which are provided four generally L-shaped recesses 118 each for receiving one of the protrusions 116. Along an outer surface of a lower end of the middle body part 102a are provided four rectangular protrusions 120 (of which only two are shown in FIG. 4). For the bottom body part 102c, along an inner surface of an upper edge of which are provided four generally L-shaped recesses 122 each for receiving one of the protrusions 120.

Figure 5:
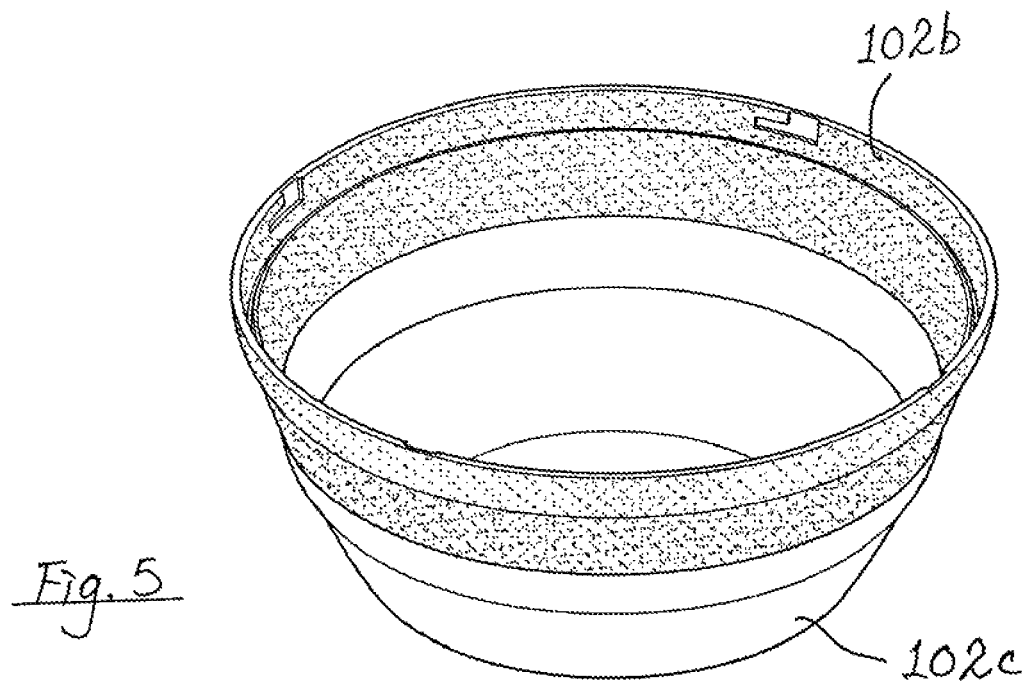
FIGS. 5 and 6 show the steps of assembling the outer bowl shown in FIG. 4.
Figure 6:
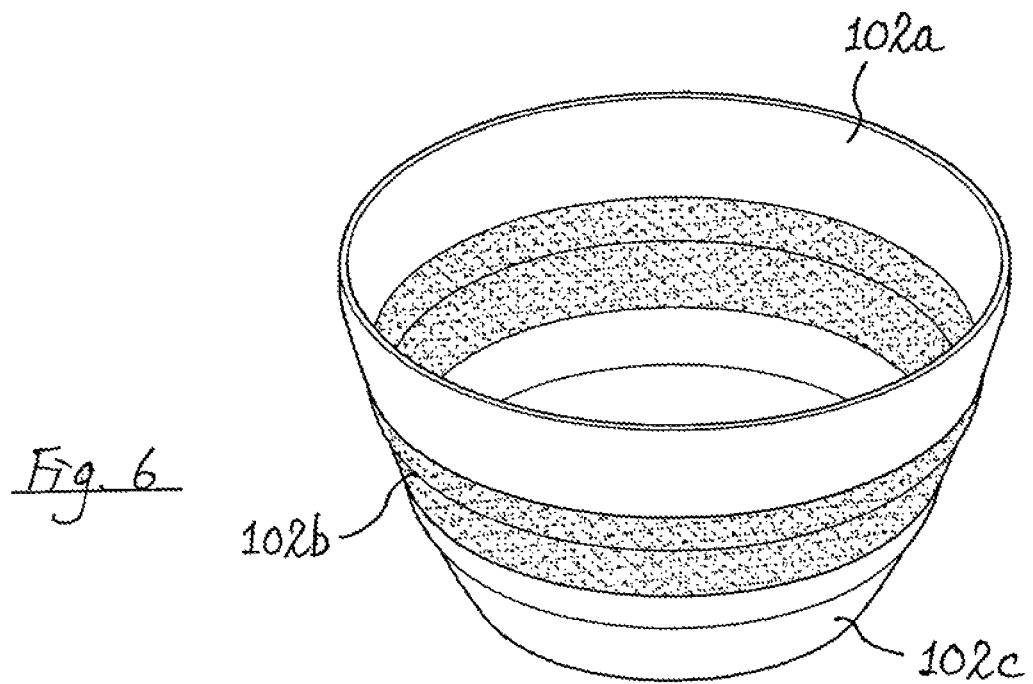

As shown in FIGS. 5 and 6, to assemble the bowl 102, the middle body part 102b is first releasably engaged with and on the bottom body part 102c, and the bop body part 102a is then releasably engaged with and on the middle body part 102b. As shown in more detail in FIGS. 7 to 9, the top body part 102a is shown as being about to be engaged with the middle body part 102b, and the middle body part 102b is shown as being engaged with the bottom body part 102c. By comparing FIGS. 8 and 9, it can be seen that, to releasably engage the protrusion 116 of the top body part 102a with the recess 118 of the middle body part 102b, the protrusion 116 is first received downwardly into the recess 118 (in the direction of the arrow P in FIG. 8), and then the top body part 102a is rotated relative to the middle body part 102b (in the direction indicated of the arrow S in FIG. 9) to push the protrusion 116 into the narrow portion of the recess 118, to form the releasable engagement as the one shown in FIG. 9.

The top body part 102a carries an o-ring 124a, which may be made of silicone rubber, for providing water-proof sealing between the top body part 102a and the middle body part 102b when they are engaged with each other. Similarly, the middle body part 102b also carries a silicone rubber o-ring 124b for providing water-proof sealing between the middle body part 102b and the bottom body part 120c when they are engaged with each other.

Figure 10:
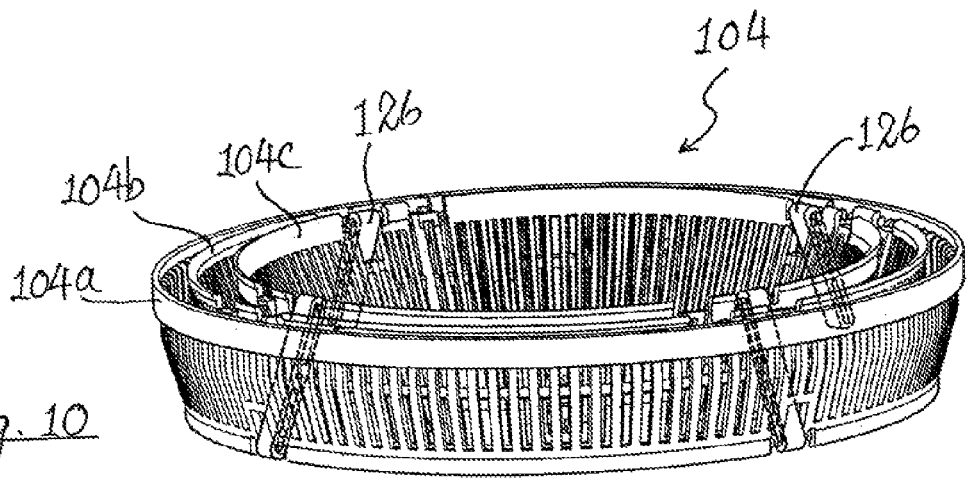
FIG. 10 is a perspective view of the basket of the assembly shown in FIG. 2A in a fully collapsed configuration.
Figure 11:
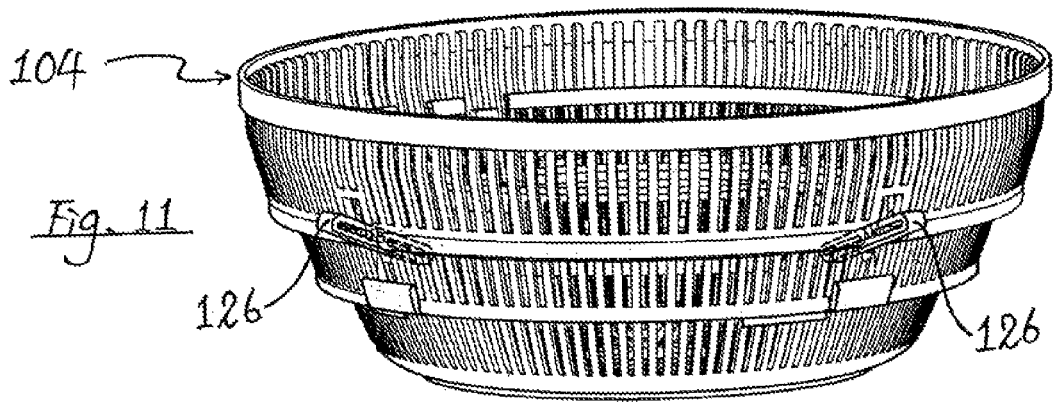
FIG. 11 is a perspective view of the basket of FIG. 10 in a partially expanded configuration.
Figure 12:
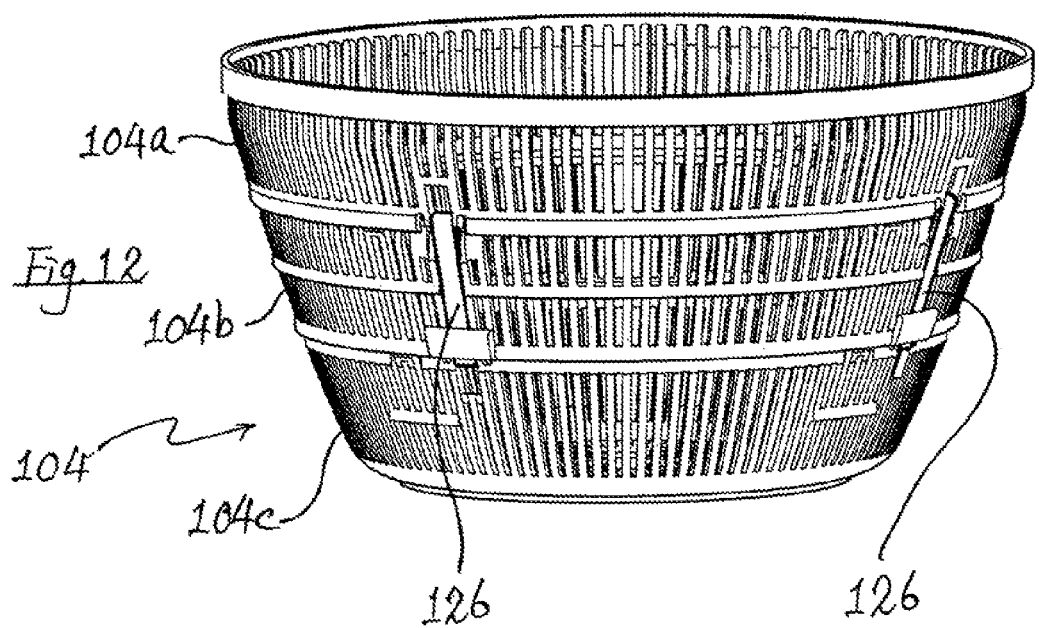
FIG. 12 is a perspective view of the basket of FIG. 10 in a fully expanded configuration.

FIGS. 10 to 12 show various configurations in which the basket 104 of the bowl and basket assembly 100 may assume. In particular, FIG. 10 shows a fully collapsed configuration; FIG. 11 shows a partially expanded configuration; and FIG. 12 shows a fully expanded configuration. In can be seen that, in the fully expanded configuration as shown in FIG. 12, a top body part 104a sits on a middle body part 104b, which in turn sits on a bottom body part 104c. On the other hand, in the fully collapsed configuration as shown in FIG. 10, the three body parts 104a, 104b, 104c are on the same level and generally concentric with one another. In particular, the middle body part 104b is within the top body part 104a, and the bottom body part 104c is in the innermost position, i.e. it is within the middle body part 104b.

Figure 13:
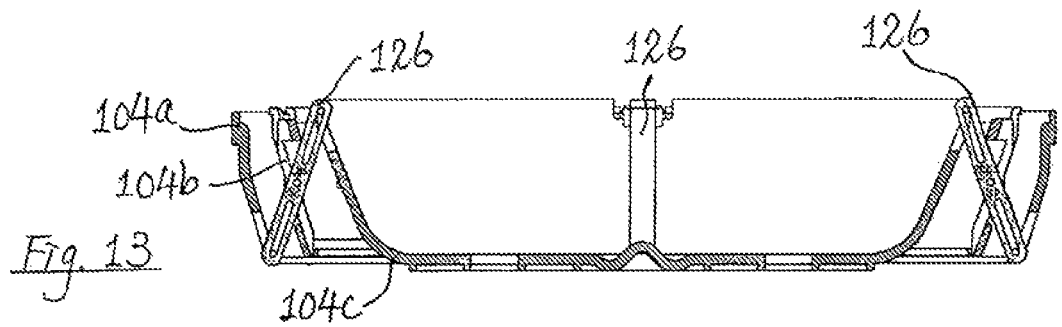
FIGS. 13 to 16 are sectional views showing the steps of moving the basket of FIG. 12 from its fully collapsed configuration to its fully expanded configuration.
Figure 14:
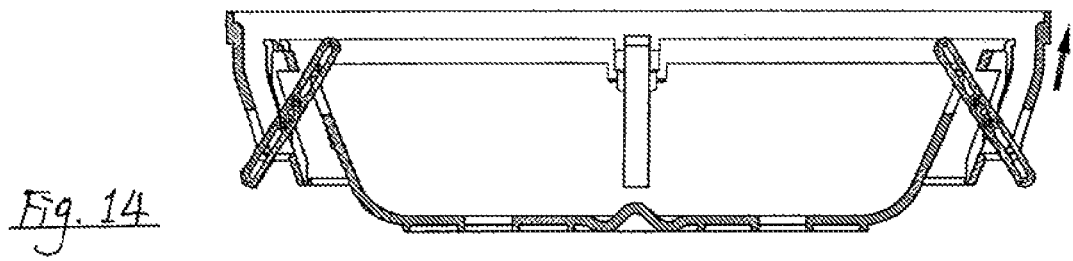
Figure 15:
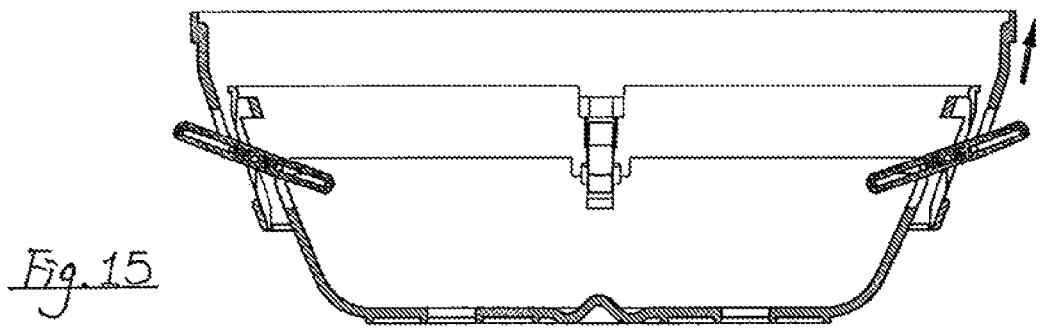
Figure 16:
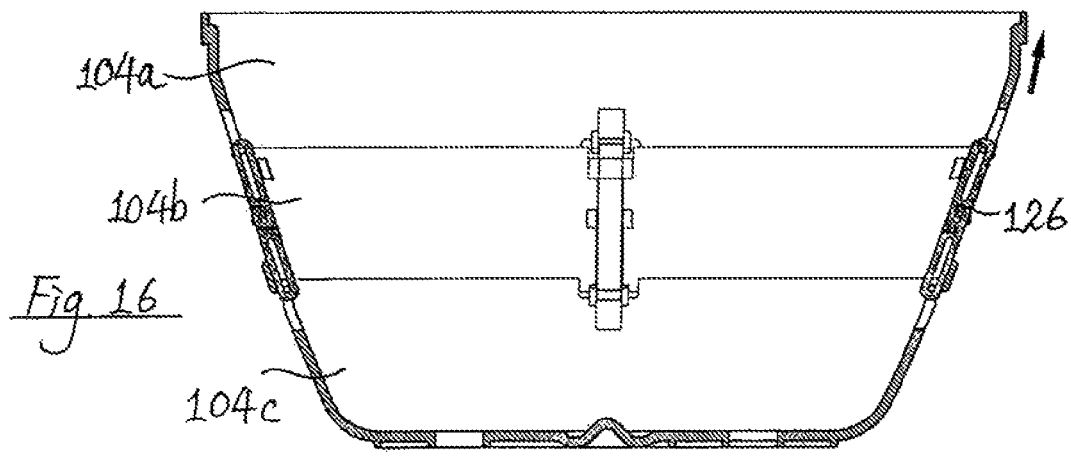

The body parts 104a, 104b, 104c are always connected with one another by four links 126. As shown in FIGS. 13 to 16, during movement of the body parts 104a, 104b, 104c between the fully collapsed configuration (as shown in FIG. 13) to the fully expanded configuration (as shown in FIG. 16), the links 126 slide and rotate relative to the top body part 104a and the bottom body part 104c, and the links 126 only rotate relative to the middle body part 104b.

Figure 17:
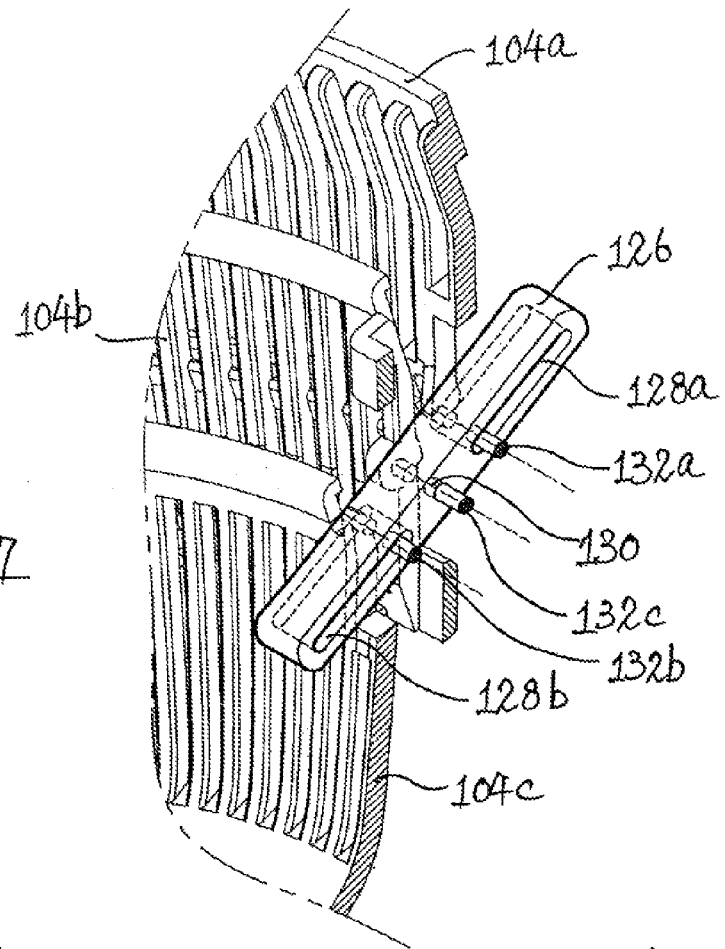
FIG. 17 is a partial enlarged view of the link connecting the body parts of the basket of FIG. 12.
Figure 18:
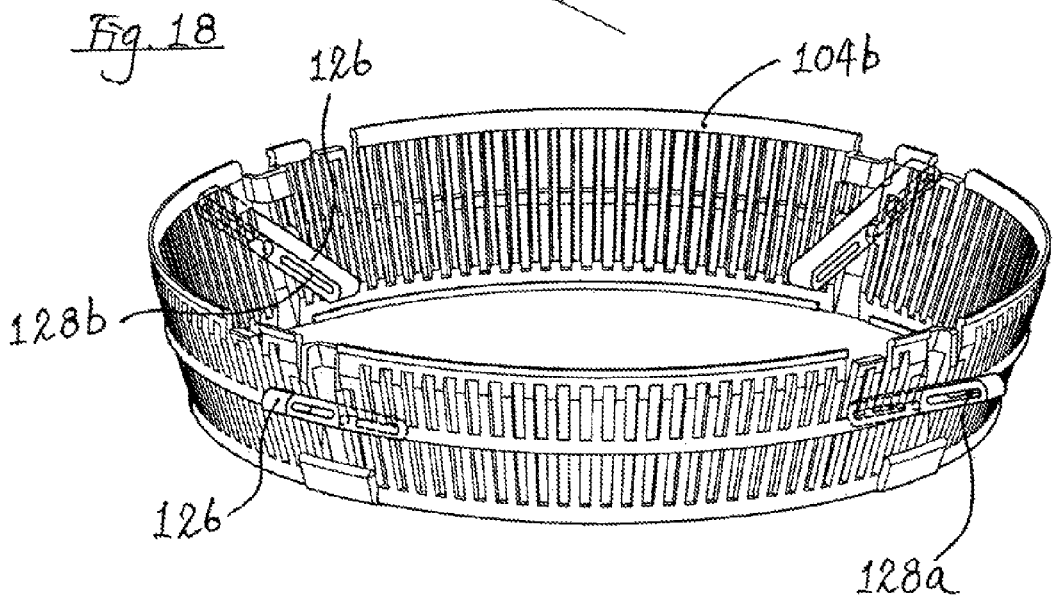
FIG. 18 is a perspective view of the middle body part of the basket of FIG. 12.

As can be seen more clearly in FIGS. 17 and 18, each of the links 126 has two parallel slots 128a, 128b and a through-hole 130. The slot 128a receives a pin 132a carried by the top body part 104a for relative sliding and rotational movement; the slot 128b receives a pin 132b carried by the bottom body part 104c for relative sliding and rotational movement; and the through-hole 130 receives a pin 132c for relative rotational movement. By way of such an arrangement, the body parts 104a, 104b, 104c may be manipulated to move between the fully collapsed configuration and the fully expanded configuration. The links 126 are kept at the positions as shown in FIG. 16 by frictionally engaging the top body part 104a and the bottom body part 104c. The basket 104 may thus remain in the fully expanded configuration as shown in FIG. 12. The links 126 may be manually displaced from the positions as shown in FIG. 16 so as to move the body parts 104a, 104b, 104c to the fully collapsed configuration as shown in FIG. 10.

FIG. 19 shows an exploded bottom perspective view of the cover and driving mechanism assembly 112 shown in FIG. 3, forming part of a salad spinner. As shown in FIG. 19, the assembly 112 includes a cover 136 for releasably engaging with and covering the bowl 102. The cover 136 has a housing 140 containing a transmission mechanism with an output spindle 142 for engagement with a hole 144 of a top 138. Upon rotational of the output spindle 142 about its longitudinal axis, the top 138 will be brought into simultaneous rotational movement about the same axis. Returning to FIG. 3, on an upper surface of the assembly 112 is a manually operable lever 146 which may be pivoted to and fro to cause the spindle 142 to rotate about its longitudinal axis in one direction, thus causing the top 138 to exhibit rotational movement in like manner.

The top 138 has three hingedly engaged wings 148 which may be pivoted about a respective axis (all being perpendicular to the longitudinal axis of the top 138) between the extended position as shown in FIG. 19 and the folded position as shown in FIG. 20. When in the extended position as shown in FIG. 19, the assembly 112 may be placed on the bowl and basket assembly 100 and operated to impart rotational movement to the basket 104 relative to the bowl 102 about the axis M-M. In particular, each wing 148 has a toe 150 which, when the assembly 112 is placed on the bowl and basket assembly 100, engages with a respective perforation in the basket 104 for bringing the basket 104 into simultaneous rotational movement.

Figure 21:
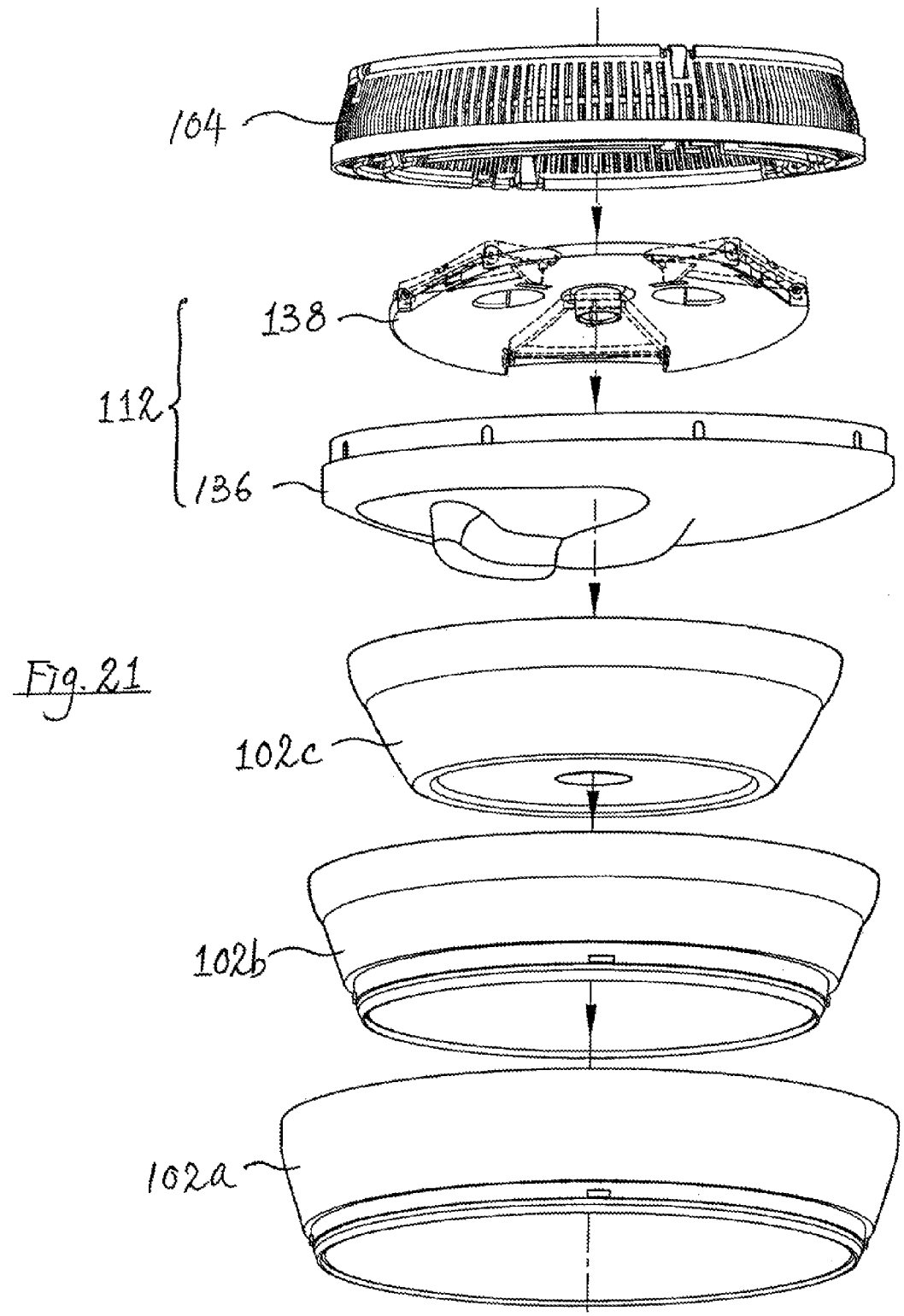
FIG. 21 is an exploded view of the parts forming the salad spinner shown in FIG. 3 arranged for packaging.
Figure 22:
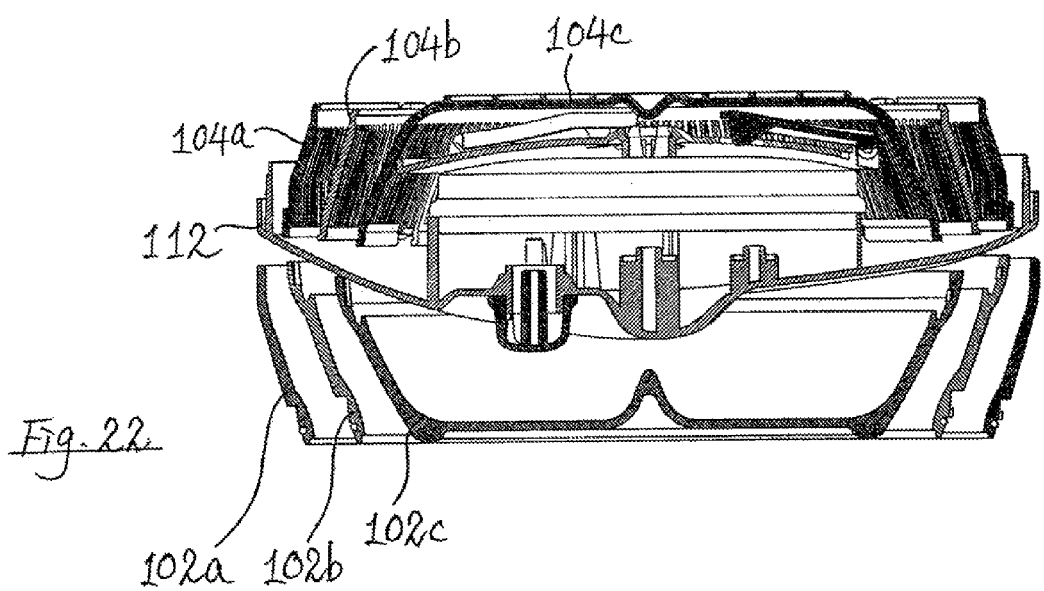
FIG. 22 is a sectional view of the parts of the salad spinner of FIG. 21 as packaged.
Figure 23:
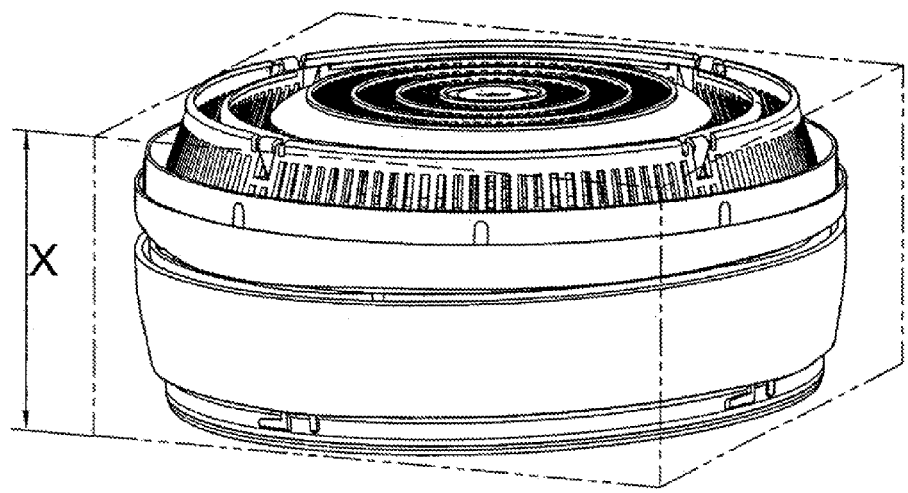
FIG. 23 is a perspective view of the packaged salad spinner of FIG. 22.

It can be seen that the components forming a salad spinner including the bowl and basket assembly 100 may form a kit, as shown in FIG. 21, and be further packaged as shown in FIGS. 22 and 23, with a height of X. It can be clearly seen in FIG. 24 that, while the volume of the bowl and basket assembly 100, when assembled, is no less than that of the conventional bowl and basket assembly 10 of FIGS. 1A and 1B, a salad spinner including the conventional bowl and basket assembly 10 and a cover 20, when packaged, will be of a height of Y+Z, whereas a salad spinner including the bowl and basket assembly 100 according to a first embodiment of the present invention and including the cover and driving mechanism assembly 112, when packaged, will be of a height of X, which is significantly smaller than Y+Z.

Figure 25:
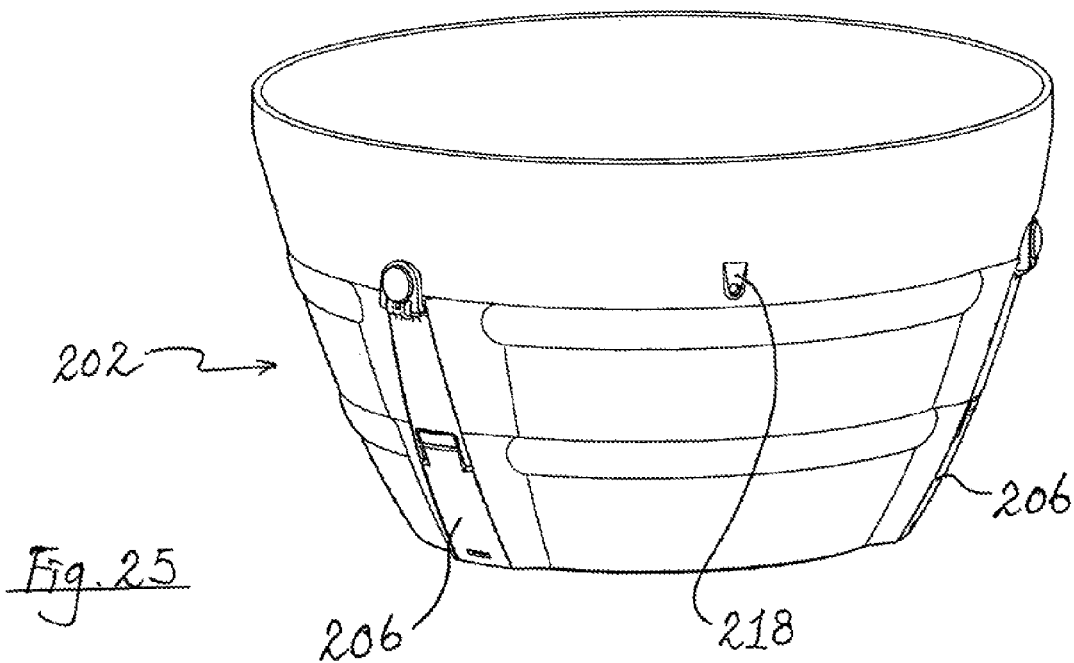
FIG. 25 is a perspective view of the outer bowl of the assembly shown in FIG. 2B.
Figure 26:
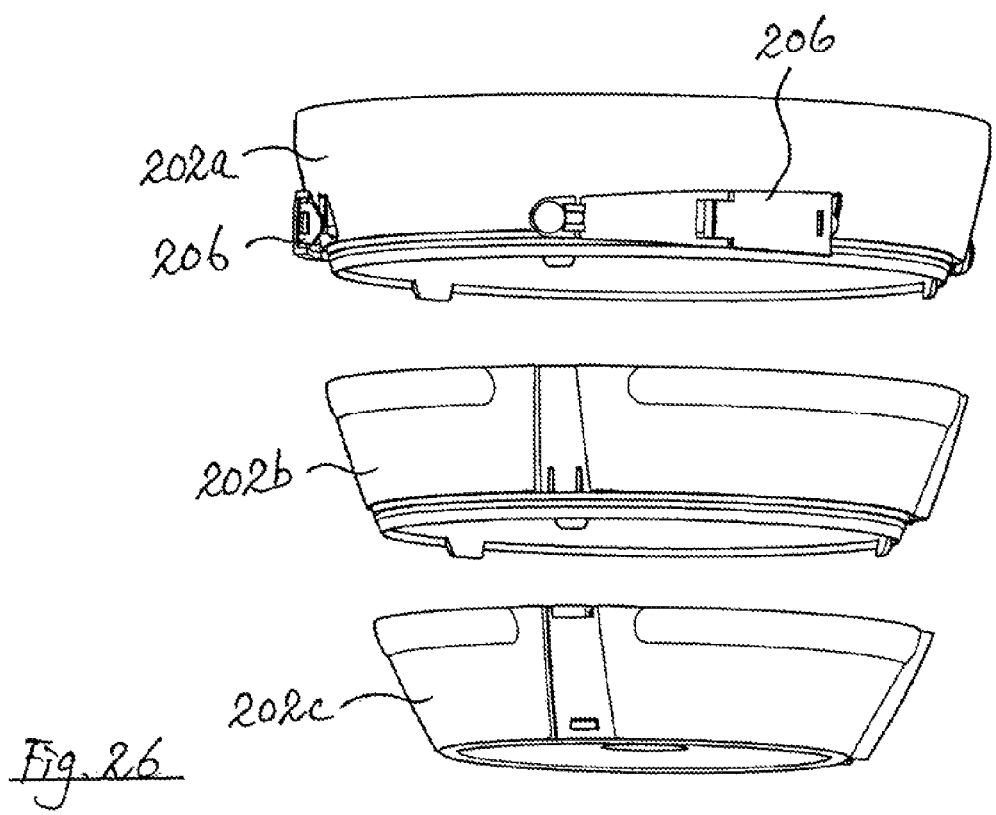
FIG. 26 is an exploded view of the body parts of the outer bowl shown in FIG. 25.

FIG. 25 shows a bowl 202 of the bowl and basket assembly 200 of FIG. 2B. It can be seen in FIG. 26 that the bowl 202 is made up of a top body part 202a, a middle body part 202b and a bottom body part 202c. The top body part 202a carries three clasps 206, of which only two are shown in FIGS. 25 and 26. The clasps 206 span from the top body part 202a, and across the middle body part 202b and the bottom body part 202c.

Figure 30:
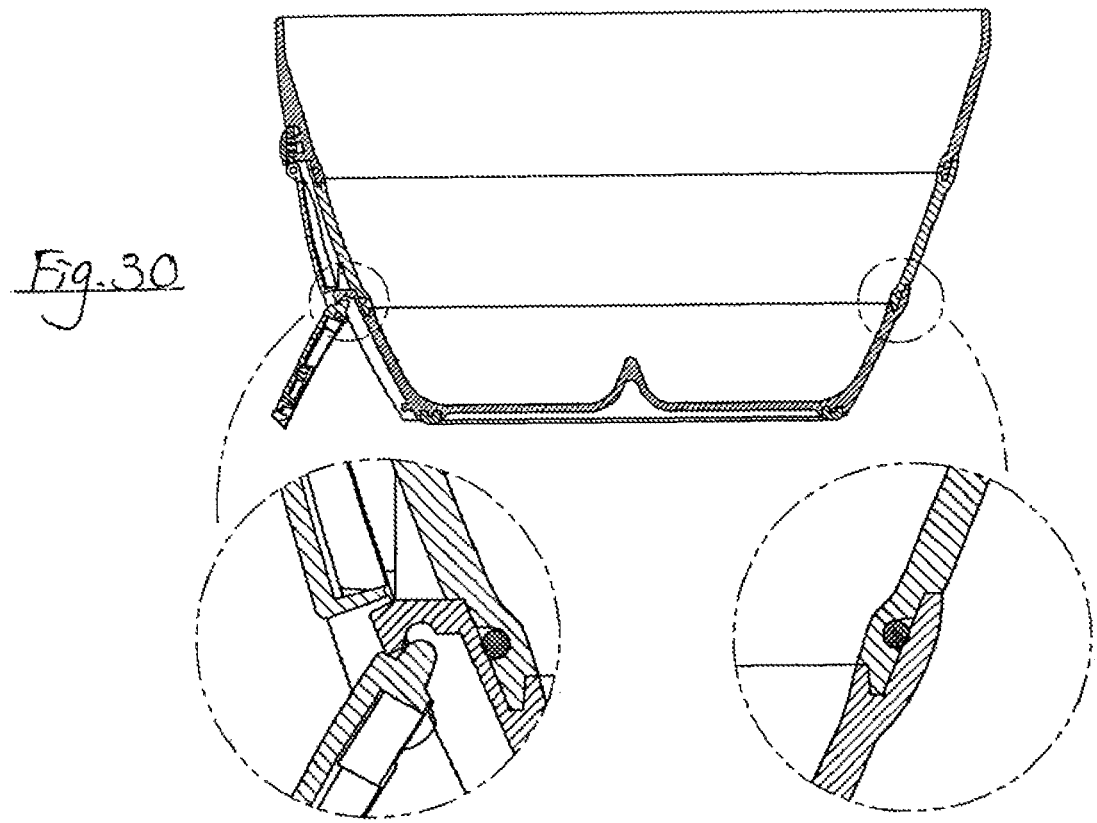
FIGS. 30 and 31 are sectional views showing assembly of the outer bowl shown in FIG. 25.
Figure 31:
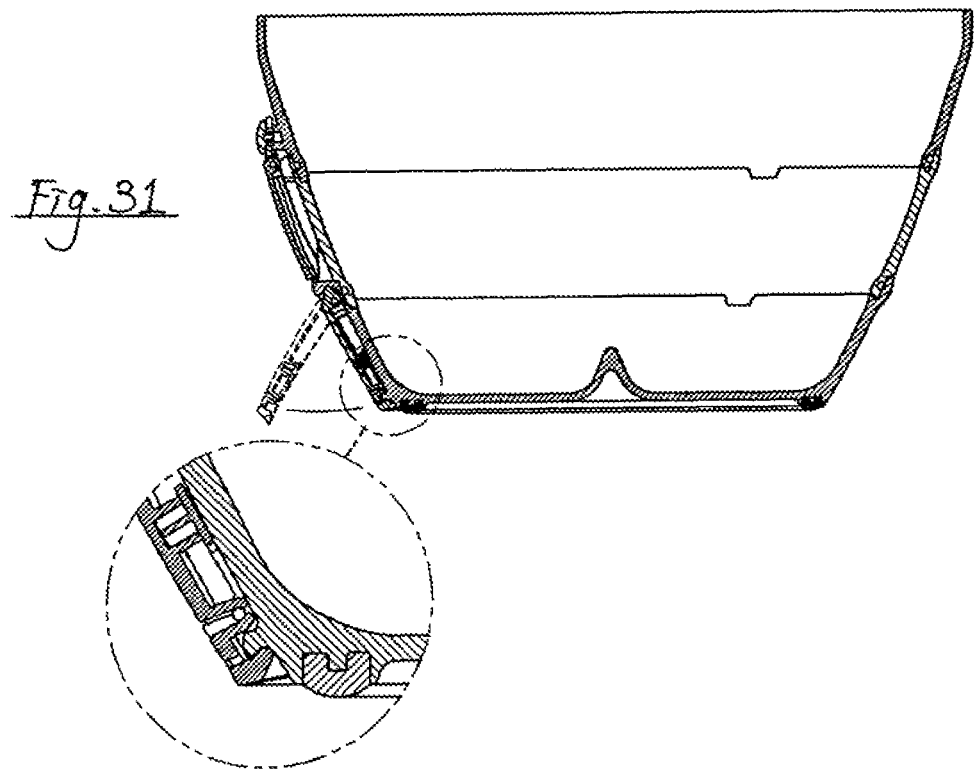

As shown in FIGS. 27 to 29, each clasp 206 has an ear 208 pivotally engaged with an inner arm 210, which is in turn pivotally engaged with an outer arm 212. The ear 208 is engaged, via a bolt 214, with the top body part 202a for rotational movement relative to the top body part 202a about the axis T-T. As shown further in FIGS. 30 and 31, the clasps 206 may be extended across the body parts 202a, 202b, 202c, and be releasably engaged with the body parts 202b, 202c for assembling the bowl 202. In order to prevent the clamps 206 from dangling when the body parts 202a, 202b, 202c are disengaged from one another, on the outer wall of the top body part 202a, to which the clasp 206 is fixed, are three recesses 218 (of which only one is shown in FIGS. 25 and 27) each with a stud for establishing releasable engagement with an engagement part of the outer arm 212, as shown in FIG. 26.

Figure 32:
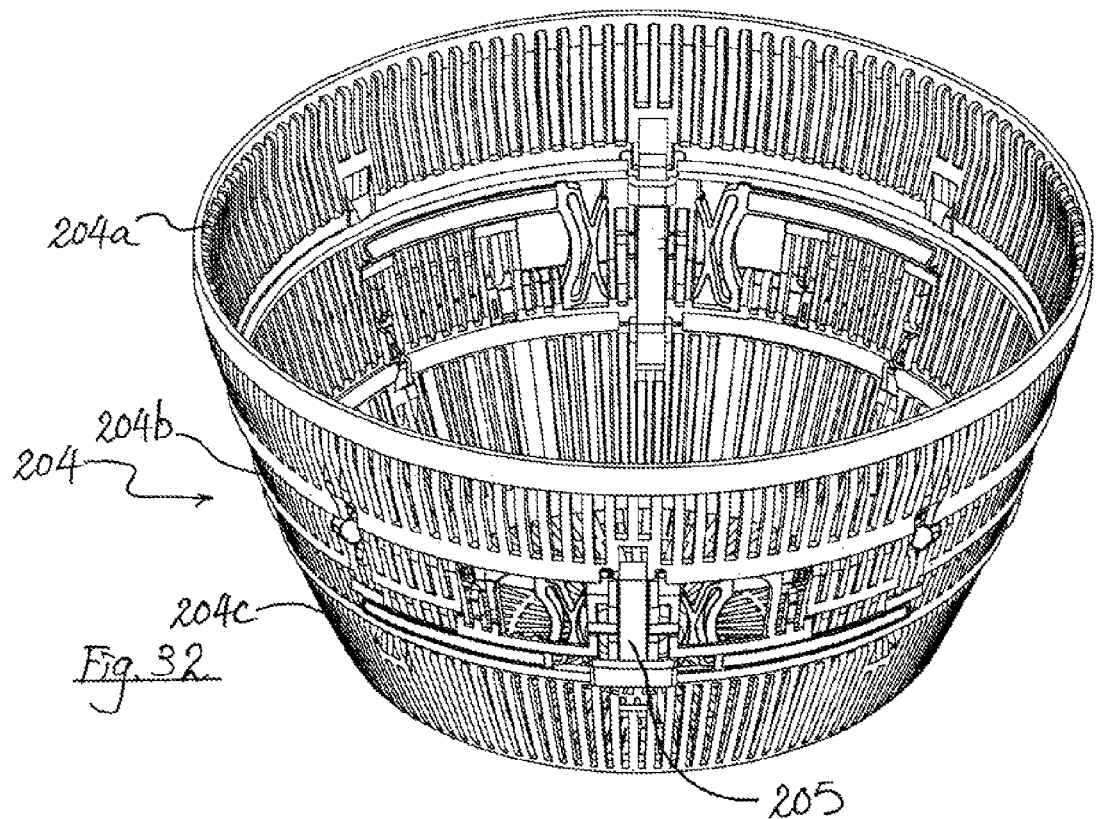
FIG. 32 is a perspective view of an alternative basket which may be used in the bowl and basket assemblies shown in FIGS. 2A and 2B.
Figure 33:
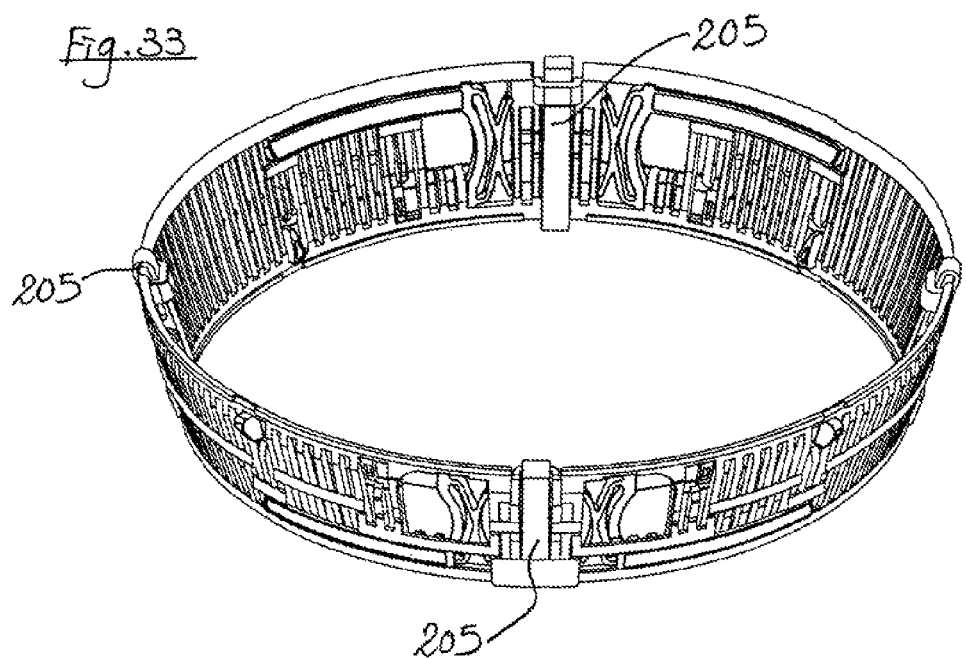
FIG. 33 is a perspective view of a middle body part of the basket shown in FIG. 32.

A perforated basket 204 of the bowl and basket assembly 200 is shown in FIG. 32 in its fully expanded configuration. The basket 204 has three body parts, namely a top body part 204a, a middle body part 204b, and a bottom body part 204c. In this fully expanded configuration, the top body part 204a sits on the middle body part 204b, which in turn sits on the bottom body part 204c. The middle body part 204b is shown in FIG. 33.

As shown in FIGS. 32 and 36, the structure of the basket 204 is basically the same as that of the basket 104 of the bowl and basket assembly 100 discussed above. The body parts 204a, 204b, 204c are also always connected with one another by a number of links 205. The main difference resides in a number of locks 220a, 220b carried by the middle body part 204b of the basket 204.

The locks 220a, 220b are made of a resilient material, e.g. plastics, which allows the locks 220a, 220b to deform to perform the locking and unlocking functions, to be discussed below. The lock 220a has a hand-operable portion 222 from which a pair of curved and parallel arms 224a, 224b extend. At the free end of each of the arms 224a, 224b is a protrusion 226a, 226b, and the protrusions 226a, 226b extend towards opposite directions. Similarly, the lock 220b has a hand-operable portion 228 from which a pair of curved and parallel arms 230a, 230b extend. At the free end of each of the arms 230a, 230b is a protrusion 232a, 232b, and the protrusions 232a, 232b extend towards opposite directions.

Turning now to FIGS. 37 to 40, it can be seen that when at the fully expanded configuration, the protrusion 226a of the arm 224a of the lock 220a abuts a lower edge of the top body part 204a, and the protrusion 226b of the arm 224b abuts an upper edge of the bottom body part 204c. The lock 220b is similarly positioned relative to the top body part 204a, the middle body part 204b, and the bottom body part 204c.

From its stable position as shown in FIGS. 36 and 38, the hand-operable portion 228 of the lock 220a may be moved in the direction indicated by the arrow G in FIG. 38 to deform the lock 220a against a fixed rib 250 of the middle body part 204b. When thus resiliently deformed, the protrusion 226a is moved out of abutment with the lower edge of the top body part 204a, as shown in FIG. 39, until it is below a recess 252 of the top body part 204a, whereupon the top body part 204a may move downwardly relative to the middle body part 204b. Upon the same resilient deformational movement of the hand-operable portion 228, the protrusion 226b is also moved out of abutment with the upper edge of the bottom body part 204c, thus allowing the middle body part 204b to move downwardly relative to the bottom body part 204c. Upon release of the force on the hand-operable portion 228, the lock 220a will return, by reason of its own resilience, from its deformed contracted configuration to its stable extended configuration.

Figure 41:
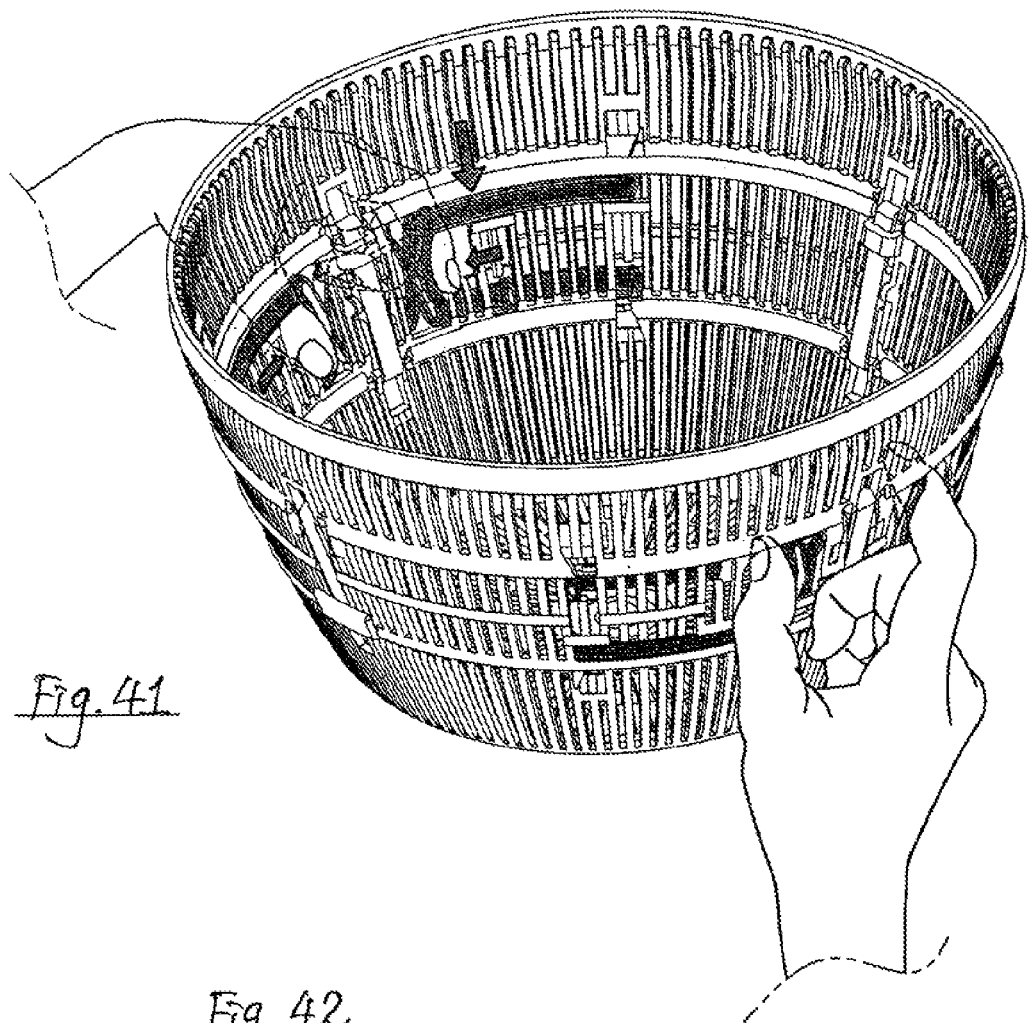
FIG. 41 shows manual operation of the locks for allowing collapse of the basket shown in FIG. 32.
Figure 42:
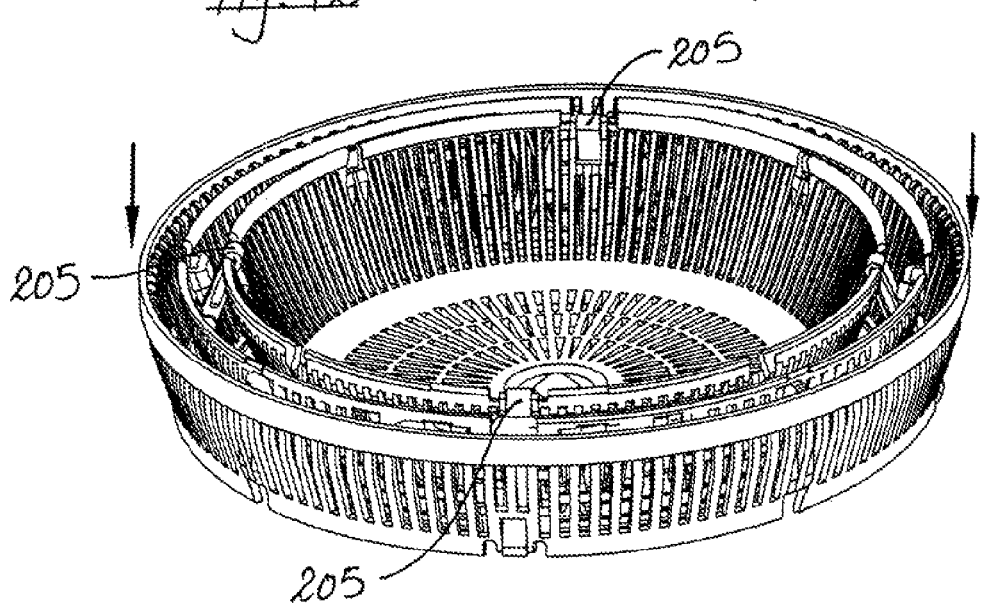
FIG. 42 shows the basket shown in FIG. 41 in a collapse configuration.

It can be seen that, in the fully expanded position, with the locks 220a, 220b installed, it is not possible to move the basket 204 from its full expanded configuration to its partially or fully collapsed configuration. In order to collapse the basket 204, a user may operate the hand-operable portions 228 of the locks 220a, 220b, as shown in FIG. 41, whereupon basket 204 may move to the collapsed configuration as shown in FIG. 42.

It should be noted that the bowl 102 and the basket 204 may form a bowl and basket assembly, which may form part of a salad spinner. Similarly, the bowl 202 and the basket 104 may form a bowl and basket assembly, which may form part of a salad spinner. It can also be seen that as the parts of the bowl and basket assemblies 100, 200 are easily assembled and disassembled, these may be provided and sold in a kit form, allowing users to assemble and disassemble the assemblies 100, 200 themselves.

It should be understood that the above only illustrates an example whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A bowl and basket assembly (100, 200) including:
a perforated basket (104, 204); and
a bowl (102, 202) for receiving said basket;
characterized in that said basket includes at least a first body member (104a, 204a) and a second body member (104b, 204b) connected with each other via at least one link member (126, 205), wherein said body members are movable relative to each other between a first configuration in which said first body member sits on said second body member, and a second configuration in which said second body member is within said first body member, and further characterized in that said basket includes at least a third body member (104c, 204c) connected with said first and second body member via said link member, and further characterized in that said first, second and third body members are movable relative to one another between a first configuration in which said first body member sits on said second body member and said second body member sits on said third body member, and a second configuration in which said second body member is within said first body member, and said third body member is within said second body member, and further characterized in that said link member is slidable and rotatable relative to said first and third body members during movement of said first, second and third body members between said first and second configurations.

2. An assembly according to claim 1 further characterized in that said first and second body members are connected with each other via a plurality of link members.

3. An assembly according to claim 1 further characterized in that said first, second and third body members are connected with each other via a plurality of link members.

4. An assembly according to claim 1 further characterized in that said link member has a first slot (128a) and a second slot (128b) which are parallel with each other, wherein said first slot is engaged with at least a pin (132a) of said first body member for relative sliding and rotational movement and said second slot is engaged with at least a pin (132b) of said third body member for relative sliding and rotational movement.

5. An assembly according to claim 1 further characterized in including locking means (220a, 220b) movable between a first configuration in which movement of said body members from said first configuration to said second configuration is prevented and a second configuration in which movement of said body members from said first configuration to said second configuration is allowed.

6. An assembly according to claim 5 further characterized in that said locking means is biased towards said first configuration.

7. An assembly according to claim 5 further characterized in that said locking means is resilient.

8. A salad spinner including a bowl and basket assembly according to claim 1.

9. A salad spinner according to claim 8 further characterized in including a cover member for releasably covering an open end of said basket and an open end of said bowl.

10. A salad spinner according to claim 9 further characterized in that said cover member includes driving mechanism adapted to drive said basket into rotational movement relative to said bowl about a substantially common longitudinal axis.

11. A salad spinner according to claim 10 further characterized in that said driving mechanism includes means for releasably engaging at least one perforation of said basket for simultaneous rotational movement relative to said bowl.

12. A salad spinner according to claim 11 further characterized in that said releasable engaging means is carried by at least one wing member which is pivotably movable between an extended position and a folded position.

13. A bowl and basket assembly (100, 200) including:
a perforated basket (104, 204); and
a bowl (102, 202) for receiving said basket;
characterized in that said basket includes at least a first body member (104a, 204a) and a second body member (104b, 204b) connected with each other via at least one link member (126, 205), wherein said body members are movable relative to each other between a first configuration in which said first body member sits on said second body member, and a second configuration in which said second body member is within said first body member, and further characterized in that said basket includes at least a third body member (104c, 204c) connected with said first and second body member via said link member, and further characterized in that said first, second and third body members are movable relative to one another between a first configuration in which said first body member sits on said second body member and said second body member sits on said third body member, and a second configuration in which said second body member is within said first body member, and said third body member is within said second body member, and further characterized in that said link member is rotatable relative to said second body member during movement of said first, second and third body members between said first and second configurations.

14. An assembly according to claim 13 further characterized in that said link member has a hole (130) for receiving at least a pin (132c) of said second body member for relative rotational movement.

15. A salad spinner kit including a bowl and basket assembly kit according to claim 13.

16. A salad spinner kit according to claim 15 further characterized in including a cover member for releasably covering an open end of said basket and an open end of said bowl.

17. A salad spinner kit according to claim 16 further characterized in that said cover member includes driving mechanism adapted to drive said basket into rotational movement relative to said bowl about a substantially common longitudinal axis.

18. A bowl and basket assembly (100, 200) including:
a perforated basket (104, 204); and
a bowl (102, 202) for receiving said basket;
characterized in that said basket includes at least a first body member (104a, 204a) and a second body member (104b, 204b) connected with each other via at least one link member (126, 205), wherein said body members are movable relative to each other between a first configuration in which said first body member sits on said second body member, and a second configuration in which said second body member is within said first body member, and further characterized in that said basket includes at least a third body member (104c, 204c) connected with said first and second body member via said link member, and further characterized in that said first, second and third body members are movable relative to one another between a first configuration in which said first body member sits on said second body member and said second body member sits on said third body member, and a second configuration in which said second body member is within said first body member, and said third body member is within said second body member, and further characterized in including locking means movable between a first configuration in which movement of said first, second and third body members from said first configuration to said second configuration is prevented and a second configuration in which movement of said first, second and third body members from said first configuration to said second configuration is allowed.

19. An assembly according to claim 18 further characterized in that said locking means includes at least a pair of locking members (220a, 220b) carried by said second body member.

20. An assembly according to claim 19 further characterized in that said second body member carries at least two pairs of locking members.

21. An assembly according to claim 19 further characterized in that each locking member includes first and second arm members (224a, 224b, 230a, 230b) which are parallel to each other.

22. An assembly according to claim 21 further characterized in that said first arm member carries an abutment member (226a, 232a) which, when said locking means is in said first configuration, abuts a lower edge of a wall member of said first body member.

23. An assembly according to claim 22 further characterized in that, when said locking means is in said second configuration, said abutment member of said first arm member is out of abutment with said lower edge of said well member of said first body member.

24. An assembly according to claim 21 further characterized in that said second arm member carries an abutment member (226b, 232b) which, when said locking means is in said first configuration, abuts an upper edge of a wall member of said third body member.

25. An assembly according to claim 24 further characterized in that, when said locking means is in said second configuration, said abutment member of said second arm member is out of abutment with said upper edge of said well member of said third body member.

26. A salad spinner kit including a bowl and basket assembly kit according to claim 18.

27. A salad spinner kit according to claim 26 further characterized in including a cover member for releasably covering an open end of said basket and an open end of said bowl.

28. A salad spinner kit according to claim 27 further characterized in that said cover member includes driving mechanism adapted to drive said basket into rotational movement relative to said bowl about a substantially common longitudinal axis.

29. A bowl and basket assembly (100, 200) including:
a perforated basket (104, 204); and
a bowl (102, 202) for receiving said basket;
characterized in that said basket includes at least a first body member (104a, 204a) and a second body member (104b, 204b) connected with each other via at least one link member (126, 205), wherein said body members are movable relative to each other between a first configuration in which said first body member sits on said second body member, and a second configuration in which said second body member is within said first body member, and further characterized in that said bowl includes at least a first body member (102b, 202b) and a second body member (102c, 202c) releasably engaged with each other, and further characterized in that said first body member of said bowl carries at least one rotatably movable clasp member (210).

30. An assembly according to claim 29 further characterized in that said clasp member is releasably engaged with said second body member of said bowl for releasably engaging said first body member of said bowl with said second body member of said bowl.

31. An assembly according to claim 29 further characterized in that at or adjacent a free end of said clasp is an engagement member for releasably engaging a wall member of said first body member of said bowl.

32. A salad spinner kit including a bowl and basket assembly kit according to claim 29.

33. A salad spinner kit according to claim 32 further characterized in including a cover member for releasably covering an open end of said basket and an open end of said bowl.

34. A salad spinner kit according to claim 33 further characterized in that said cover member includes driving mechanism adapted to drive said basket into rotational movement relative to said bowl about a substantially common longitudinal axis.

35. A bowl and basket assembly (100, 200) including:
a perforated basket (104, 204); and
a bowl (102, 202) for receiving said basket;
characterized in that said basket includes at least a first body member (104a, 204a) and a second body member (104b, 204b) connected with each other via at least one link member (126, 205), wherein said body members are movable relative to each other between a first configuration in which said first body member sits on said second body member, and a second configuration in which said second body member is within said first body member, and further characterized in that said bowl includes at least a first body member (102b, 202b) and a second body member (102c, 202c) releasably engaged with each other, and further characterized in that said bowl includes at least a first body member (102a, 202a), a second body member (102b, 202b) and a third body member (102c, 202c) releasably engaged with each other, and further characterized in that said first body member of said bowl carries at least one rotatably movable clasp member, and that said clasp member is releasably engaged with said second and third body members of said bowl for releasably engaging said first body member of said bowl with said second and third body members of said bowl.

36. An assembly according to claim 35 further characterized in that at or adjacent a free end of said clasp is an engagement member for releasably engaging a wall member of said first body member of said bowl.

37. A salad spinner kit including a bowl and basket assembly kit according to claim 35.

38. A salad spinner kit according to claim 37 further characterized in including a cover member for releasably covering an open end of said basket and an open end of said bowl.

39. A salad spinner kit according to claim 38 further characterized in that said cover member includes driving mechanism adapted to drive said basket into rotational movement relative to said bowl about a substantially common longitudinal axis.

* * * * *